United States Patent
Gilbar et al.

(10) Patent No.: US 11,827,417 B2
(45) Date of Patent: Nov. 28, 2023

(54) PORTABLE REUSABLE BEVERAGE BOTTLE WITH DRINKING CUP

(71) Applicant: Remaker Labs, Inc., Santa Barbara, CA (US)

(72) Inventors: Sky Gilbar, Santa Barbara, CA (US); John Stump, Santa Barbara, CA (US)

( * ) Notice: Subject to any disclaimer, the term of this patent is extended or adjusted under 35 U.S.C. 154(b) by 0 days.

(21) Appl. No.: 17/181,833

(22) Filed: Feb. 22, 2021

(65) Prior Publication Data
US 2021/0171239 A1 Jun. 10, 2021

Related U.S. Application Data

(63) Continuation-in-part of application No. 16/446,455, filed on Jun. 19, 2019, now Pat. No. 10,945,517.

(60) Provisional application No. 63/089,979, filed on Oct. 9, 2020.

(51) Int. Cl.
| | |
|---|---|
| *B65D 41/62* | (2006.01) |
| *B65D 23/12* | (2006.01) |
| *B65D 23/00* | (2006.01) |
| *B65D 43/02* | (2006.01) |
| *B65D 21/02* | (2006.01) |

(52) U.S. Cl.
CPC ......... *B65D 23/12* (2013.01); *B65D 21/0233* (2013.01); *B65D 23/001* (2013.01); *B65D 43/0229* (2013.01)

(58) Field of Classification Search
CPC ...... A45F 3/00–18; A47G 19/00–2205; B65D 43/00–0229; B65D 23/00–12; B65D 21/00–023; B65D 85/1054; B65D 5/6602; B65D 5/001; B65D 21/02; B65D 85/62; B65D 5/005; B65D 21/0201; B65D 21/0209; B65D 21/0235; B65D 21/043; B65D 23/0885
See application file for complete search history.

(56) References Cited

U.S. PATENT DOCUMENTS

| | | | | |
|---|---|---|---|---|
| 5,243,835 | A * | 9/1993 | Padamsee | A47J 41/0044 62/530 |
| 5,406,808 | A * | 4/1995 | Babb | B65D 81/3844 62/457.4 |
| 5,934,099 | A * | 8/1999 | Cook | A61J 1/165 62/457.2 |
| 5,987,913 | A * | 11/1999 | Andrzejczak | A47G 19/02 62/457.2 |

(Continued)

*Primary Examiner* — Kareen K Thomas
(74) *Attorney, Agent, or Firm* — Lyman Smith; Patent Service Associates, Inc.

(57) ABSTRACT

A beverage container system can include a reusable beverage bottle, such as a water bottle, and a reusable beverage cup that can nest with the beverage bottle, inside a sleeve that attaches to the beverage bottle, when not in use. A beverage bottle cap can include a storage region for storing a cup cap that fits onto the beverage cup when it is removed from its nested, or stowed, configuration. From the stowed configuration, the user can twist a collet to permit removal of the beverage cup. After filled, the cup cap may be placed over the cup to prevent leakage or spillage and permit the user to access the contents. The cup may be placed, bottom side first, into the sleeve and the collet activated to connect the cup with the bottle, where a user may access each by accessing either end of the assembly.

21 Claims, 37 Drawing Sheets

(56) References Cited

U.S. PATENT DOCUMENTS

| | | | |
|---|---|---|---|
| 2015/0090711 A1* | 4/2015 | Peterson | A61J 9/0638 220/4.07 |
| 2015/0253055 A1* | 9/2015 | Tsui | B65D 43/02 280/655 |
| 2018/0099781 A1* | 4/2018 | McConnell | B65D 81/361 |
| 2018/0208361 A1* | 7/2018 | Klein | B65D 21/0224 |

* cited by examiner

PORTABLE REUSABLE BEVERAGE BOTTLE WITH DRINKING CUP

CROSS-REFERENCE TO RELATED APPLICATIONS

This application is a continuation-in-part of U.S. patent application Ser. No. 16/446,455, filed Jun. 19, 2019, the contents of which are herein incorporated by reference.

BACKGROUND OF THE INVENTION

1. Field of the Invention

Embodiments of the invention relates generally to beverage containers. More particularly, the invention relates to a portable, reusable beverage bottle, such as a water bottle, having a drinking cup that stores nested with the beverage bottle and is readily deployed and stowed as needed.

2. Description of Prior Art and Related Information

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Conventionally, if a user purchases a beverage, such as coffee, they use a paper cup with a plastic lid. Such containers are extremely convenient and inexpensive, so their use can be determined at over 100 million of them every day in the United States. Almost all of these cups are coated in plastic, and 98% of them end up in landfills. Most people would prefer to use a reusable cup whenever practical, but they just do not find it convenient to carry one around.

Reusable water bottles have become increasingly popular. In efforts to reduce plastic bottle waste, people have converted to using such water bottles and often carry them around. However, when a person wants to purchase a beverage, such as coffee, they now have to carry around both their coffee cups as well as their water bottles in two separate containers.

In view of the foregoing, there is a need for a water bottle that can include a beverage cup in a single combined unit.

SUMMARY OF THE INVENTION

Embodiments of the present invention provide a container system comprising a vessel configured to contain a first fluid therein; a shell removably attached about an exterior of the vessel; a vessel lid removably attached to an open end of the vessel, the open end extending outside of the shell; a cup movable between a nested position and a removed position, the cup being at least partially nested with a lower portion of the vessel, removably attached to the vessel, and within the shell when in the nested position; and a cup lid removably fitting on an open end of the cup, the cup lid removably engaged with the vessel lid when the cup is in the nested position.

Embodiments of the present invention further provide a container system comprising a vessel configured to contain a first fluid therein; a shell removably attached about an exterior of the vessel; a vessel lid removably attached to an open end of the vessel, the open end extending outside of the shell; a cup movable between a nested position and a removed position, the cup being at least partially nested with a lower portion of the vessel, removably attached to the vessel, and within the shell when in the nested position; a cup lid removably fitting on an open end of the cup, the cup lid removably engaged with the vessel lid when the cup is in the nested position; cup engaging male threads about an external surface thereof, the cup engaging male threads mating with female threads of the cup when the cup is in the nested configuration; vessel end male threads at the open end of the vessel, the vessel end male threads mating with female threads on the vessel lid to removably engage the vessel lid to the open end of the vessel; and cup lid male threads about a portion of the external periphery of the cup lid, the cup lid male threads engaging with female threads of the cup to removably engage the cup lid on the cup, the cup lid male threads having the same size and pitch as the cup engaging male threads.

Embodiments of the present invention also provide a container system comprising a vessel configured to contain a first fluid therein; a shell removably attached about an exterior of the vessel; a vessel lid removably attached to an open end of the vessel, the open end extending outside of the shell; a cup movable between a nested position and a removed position, the cup being at least partially nested with a lower portion of the vessel, removably attached to the vessel, and within the shell when in the nested position; a cup lid removably fitting on an open end of the cup, the cup lid removably engaged with the vessel lid when the cup is in the nested position; cup engaging male threads about an external surface thereof, the cup engaging male threads mating with female threads of the cup when the cup is in the nested configuration; vessel end male threads at the open end of the vessel, the vessel end male threads mating with female threads on the vessel lid to removably engage the vessel lid to the open end of the vessel; cup lid male threads about a portion of the external periphery of the cup lid, the cup lid male threads engaging with female threads of the cup to removably engage the cup lid on the cup, the cup lid male threads having the same size and pitch as the cup engaging male threads; a cup lid crossbar extending from an underside of the cup lid, the cup lid crossbar engaging a cross cutout formed in the vessel lid to removably engage the cup lid to the vessel lid; a cup base crossbar extending from a base of the cup, the cup base crossbar engaging the cross cutout formed in the vessel lid to removably engage the cup to the vessel lid; and a resiliently depressible ball on an inside surface of the shell, the ball engaging with a depression in the vessel, wherein the depression communicates with a slot in the vessel, the ball aligning with the slot to engage the depression with the vessel is moved inside the shell.

These and other features, aspects and advantages of the present invention will become better understood with reference to the following drawings, description and claims.

BRIEF DESCRIPTION OF THE DRAWINGS

Some embodiments of the present invention are illustrated as an example and are not limited by the figures of the accompanying drawings, in which like references may indicate similar elements.

Figure 1:
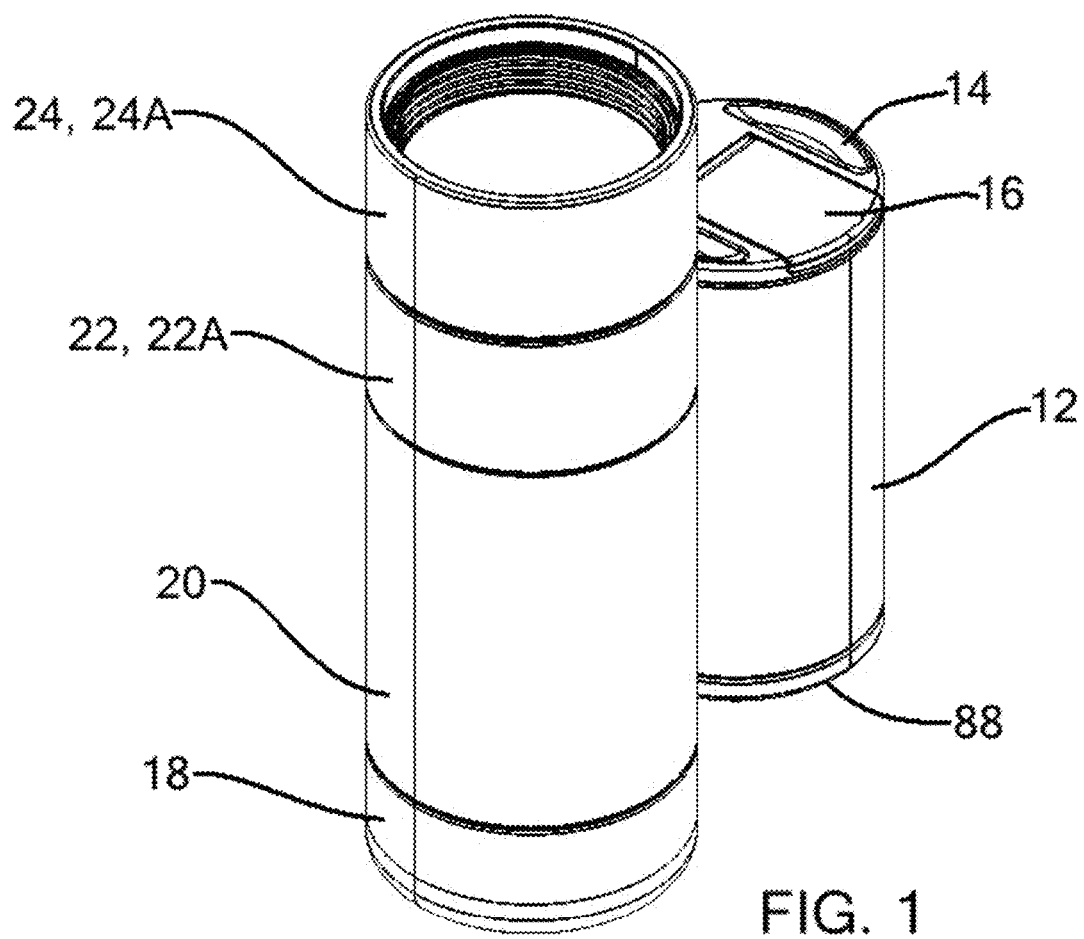
FIG. 1 illustrates a perspective view of a reusable beverage bottle and cup set, with the cup in a deployed state, according to an exemplary embodiment of the present invention.

Unless otherwise indicated illustrations in the figures are not necessarily drawn to scale. The invention and its various embodiments can now be better understood by turning to the following detailed description wherein illustrated embodiments are described. It is to be expressly understood that the illustrated embodiments are set forth as examples and not by way of limitations on the invention as ultimately defined in the claims.

DETAILED DESCRIPTION OF THE PREFERRED EMBODIMENTS AND BEST MODE OF INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

As is well known to those skilled in the art, many careful considerations and compromises typically must be made when designing for the optimal configuration of a commercial implementation of any system, and in particular, the embodiments of the present invention. A commercial implementation in accordance with the spirit and teachings of the present invention may be configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

Broadly, embodiments of the present invention provide a beverage container system that includes a reusable beverage bottle, such as a water bottle, and a reusable beverage cup that can nest with the beverage bottle, inside a sleeve that attaches to the beverage bottle, when not in use. A beverage bottle cap can include a storage region for storing a cup cap that fits onto the beverage cup when it is removed from its nested, or stowed, configuration. From the stowed configuration, the user can twist a collet to permit removal of the beverage cup. After filled, the cup cap may be placed over the cup to prevent leakage or spillage and permit the user to access the contents. The cup may be placed, bottom side first, into the sleeve and the collet activated to connect the cup with the bottle, where a user may access each container by accessing either end of the assembly.

In some embodiments, the cup may be placed onto the top of the bottle cap to secure the cup and bottle as a single unit, permitting the user to drink from the cup through the cup lid, or drink from the bottle after removing the bottle cap.

A base of the cup may include electronics that may be used, for example, as an external battery charger for electronic devices.

These and other embodiments of the present invention are discussed in greater detail in the following paragraphs.

Figure 2:
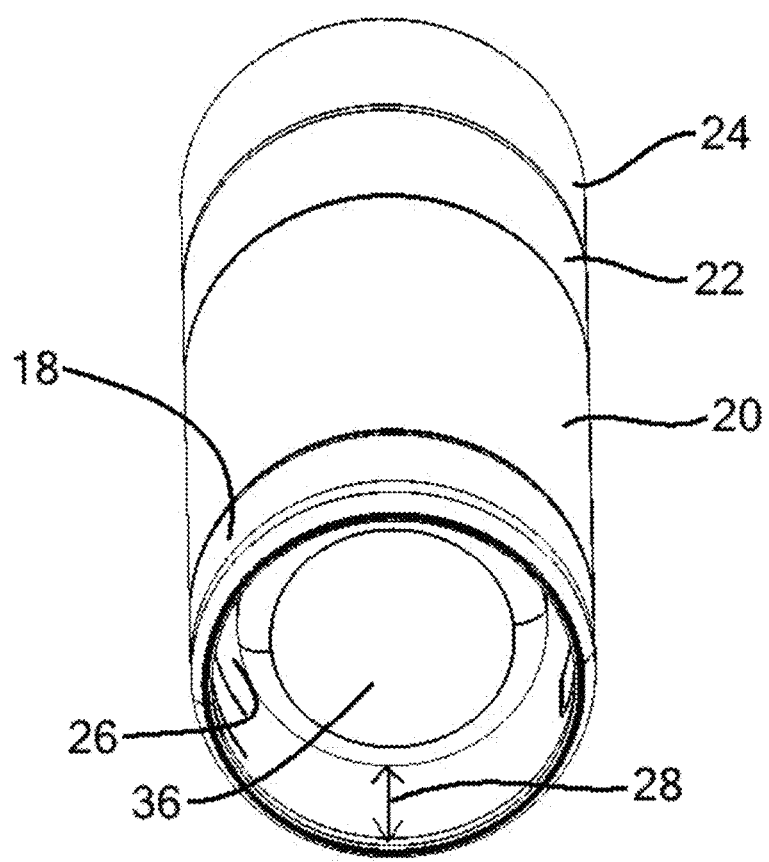
FIG. 2 illustrates a bottom view of the beverage bottle, showing a space for receiving the cup therein.

Referring to FIGS. 1 and 2, a beverage container system 10 (also referred to as system 10) can include a cup 12 (also referred to as a mug 12) having a cup cap 14 with a lid 16. The lid 16 may be movable to permit the user to access to contents within the cup 12. A bottom member 88, as discussed in greater detail below, may fit onto a bottom portion of the cup 12.

The system 10 can further include a beverage bottle 22, 22A (also referred to as water bottle 22, 22A or simply bottle 22, 22A) having a bottle cap 24, 24A disposed over an open end thereof. A sleeve 20 may fit over an outside of the bottle 22, 22A and an attachment mechanism 18, such as a collet, may be disposed about the bottom of the sleeve 20. As shown in FIG. 2, at least a lower portion of the bottle 22, 22A may have an outside diameter smaller than an inside diameter of the sleeve 20 such that a space 26 is formed therebetween. Further, as shown in FIG. 2, a depth 28 may be present between the bottom 36 of the bottle 22, 22A and the bottom of the sleeve 20.

Figure 3:
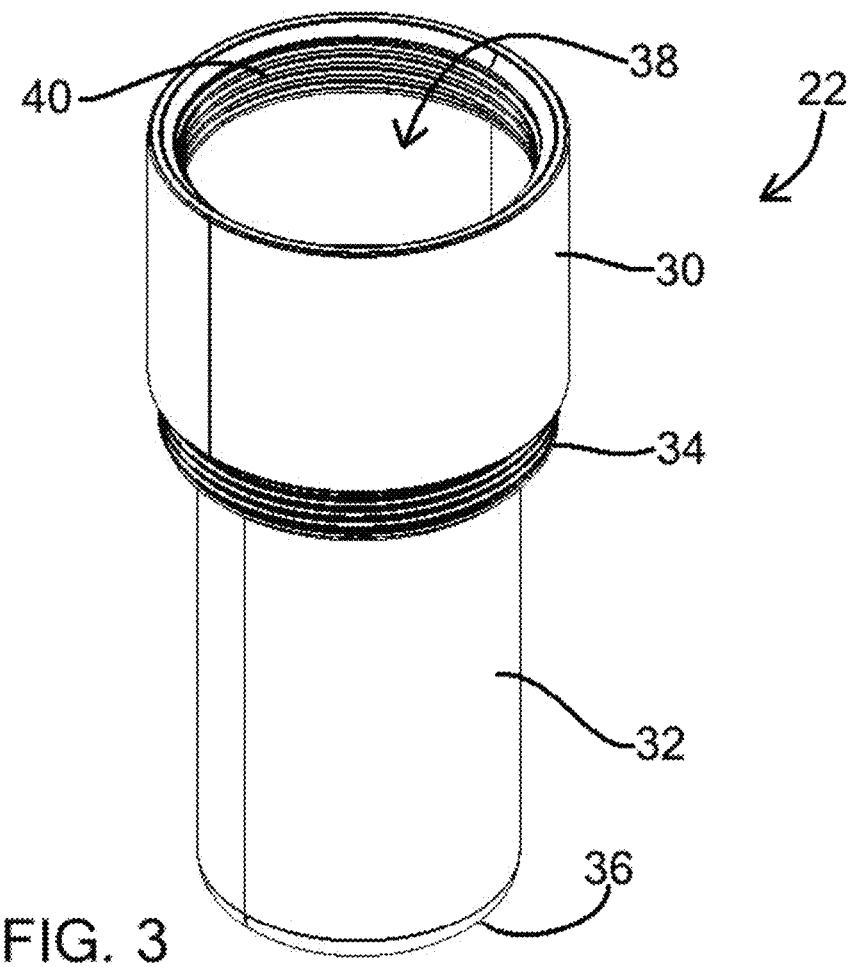
FIG. 3 illustrates a perspective view of the beverage bottle of FIG. 1, removed from its sleeve and bottle cap.
Figure 4:
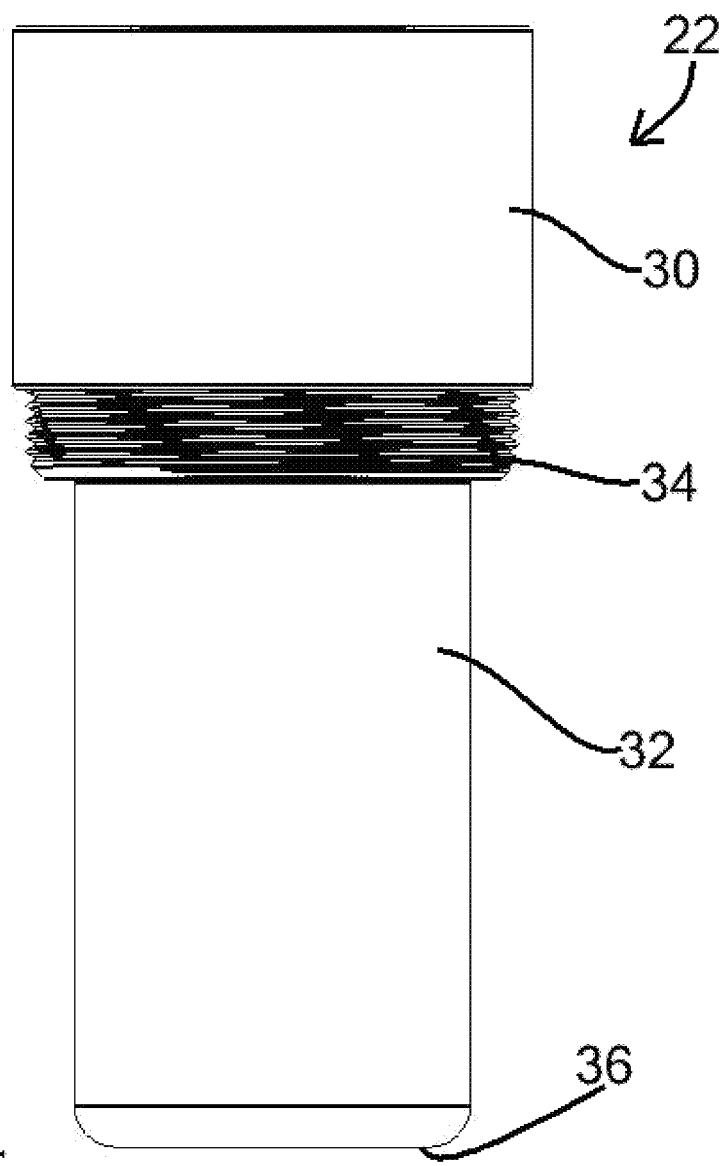
FIG. 4 illustrates a side view of the beverage bottle of FIG. 1, removed from its sleeve and bottle cap.

Referring to FIGS. 3 and 4, the bottle 22 is shown in detail. The bottle 22 can include an upper portion 30 having an outer diameter that is larger than an outer diameter of a lower portion 32 thereof. The bottle 22 can have an open top 38 and a closed bottom 36. Male threads 34 may be disposed on a lower, first end of the upper portion 30, where female threads 40 may be disposed in an upper, second end of the upper portion 30. As discussed in greater detail below, the male threads 34 may permit engagement of the bottle 20 to the sleeve 20. The female threads 40 may permit engagement of the bottle 20 with a bottle cap 24.

Figure 5:
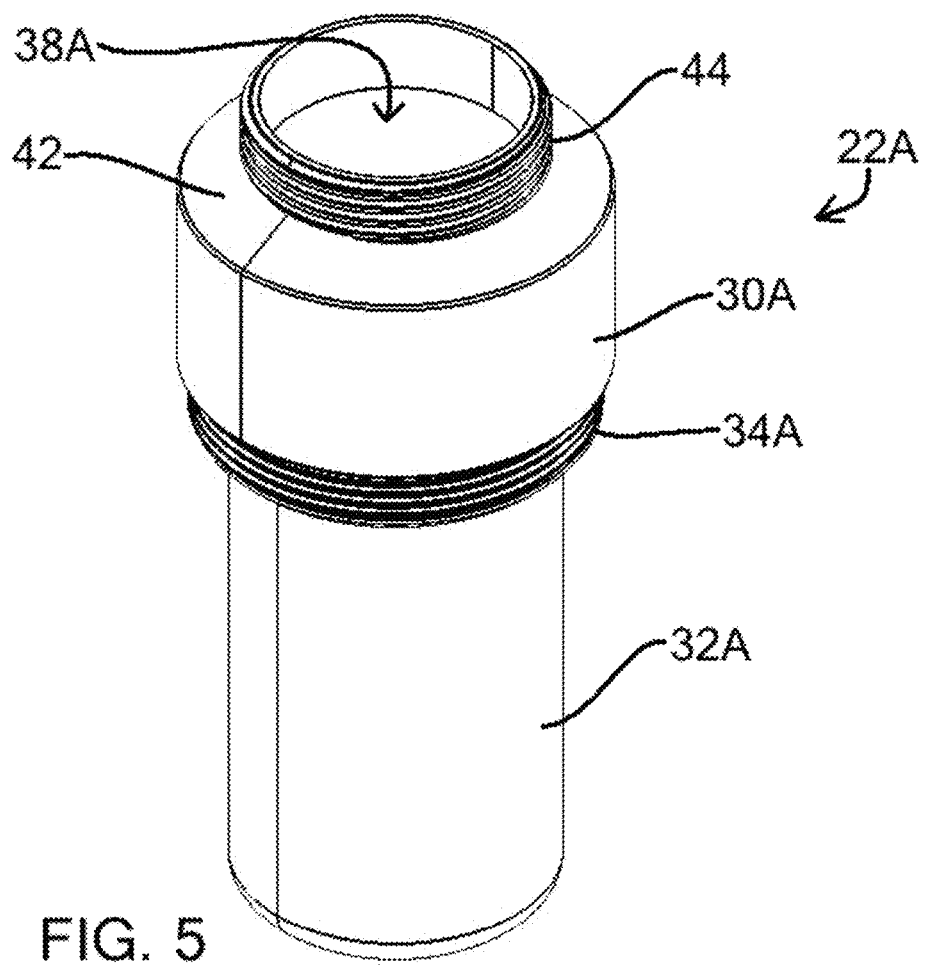
FIG. 5 illustrates an alternate embodiment of the beverage bottle of FIG. 1, having a reduced diameter upper opening, removed from its sleeve and bottle cap.
Figure 6:
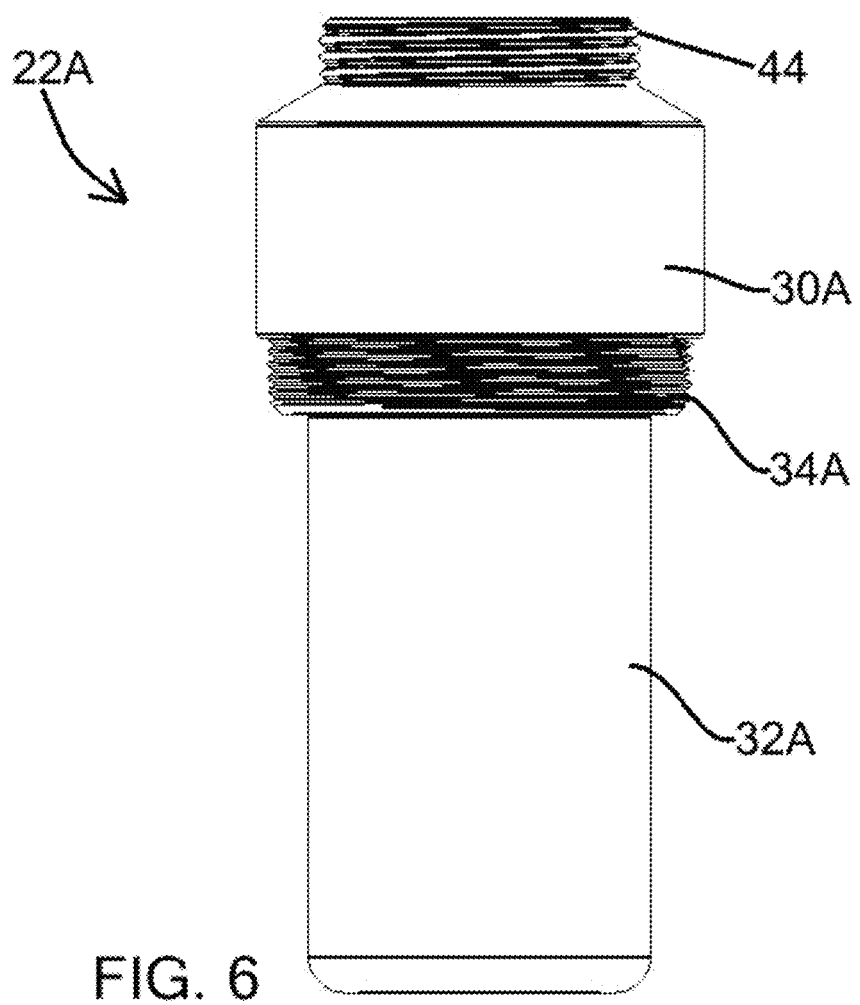
FIG. 6 illustrates a side view of the beverage bottle of FIG. 5.

Referring to FIGS. 5 and 6, an alternate embodiment of the bottle 22A is shown. The bottle 22A may be similar to the bottle 22, except that the upper, second end of an upper portion 30A thereof, may included a sloped surface 42 that reduces the diameter of the bottle 22A to terminate in male threads 44 formed about a top opening 38A of the bottle 22A. Similar to bottle 22, the bottle 22A can include male threads 34A at a lower, first end of the upper portion 30A and a lower portion 32A having a reduced diameter as compared to the upper portion 30A.

For both bottle 22 and bottle 22A, the lower portion 32, 32A may have a reduced diameter configured to receive the cup 12 in a nesting configuration. In other words, as discussed in greater detail below, the lower portion 32, 32A may be inserted into the open end of the cup 12 for storage thereof.

Figure 7:
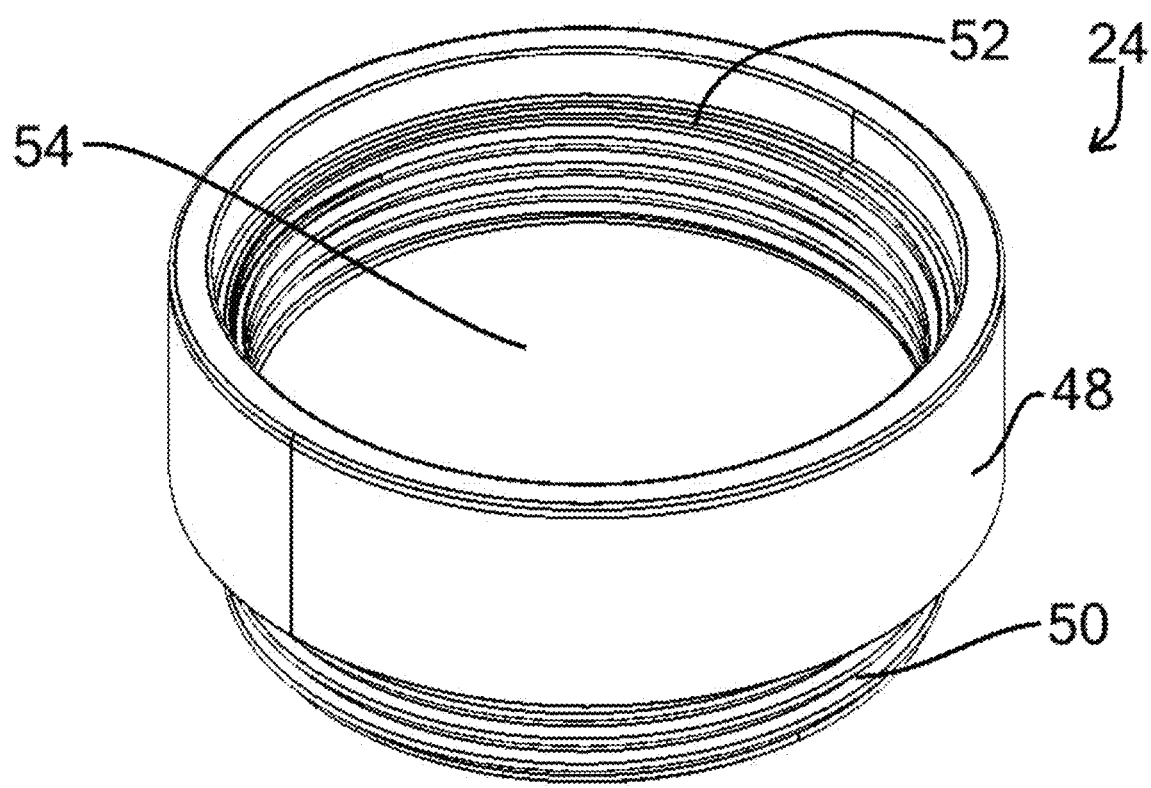
FIG. 7 illustrates a perspective view of a bottle cap configured to fit over an upper opening of the beverage bottle of FIG. 3.

Referring to FIG. 7, a bottle cap 24 can include male threads 50 that can mate with the female threads 40 of the bottle 22, where the bottle cap 24 can prevent leakage of contents from within the bottle 22 when the bottle cap 24 is disposed on the bottle 22. The bottle cap 24 can include an interior surface 54 that can seal over the open top 38 of the bottle 22. While the interior surface 54 is shown as a flat sealing surface, in some embodiments, a fluid access mechanism may be employed as part of the bottle cap 24. For example, a flip spout may be disposed in the interior surface 54 to permit a user to flip up the spout to access contents of the bottle 22 without having to remove the bottle cap 24.

The bottle cap 24 can include female threads 52 configured to receive a cup cap 14 therein, as discussed in greater detail below. An exterior 48 of the bottle cap 24 may be sized to match the exterior size of the upper portion 30 of the bottle 22 (which is exposed when the system 10 is assembled) as well as the exterior size of the sleeve 20, as shown in FIG. 1, where a continuous, uniform outer diameter may be provided for the system 10.

Figure 8:
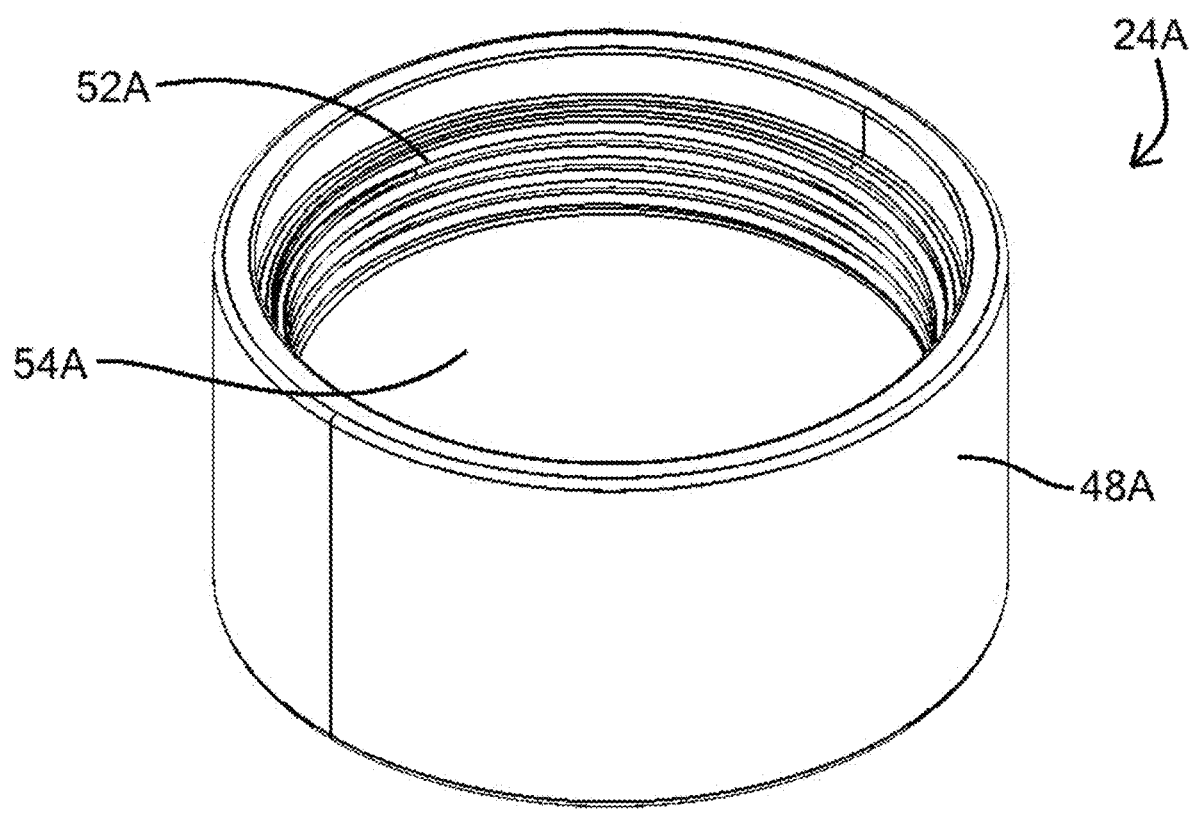
FIG. 8 illustrates a perspective view of a bottle cap configured to fit over an upper opening of the beverage bottle of FIG. 5.
Figure 9:
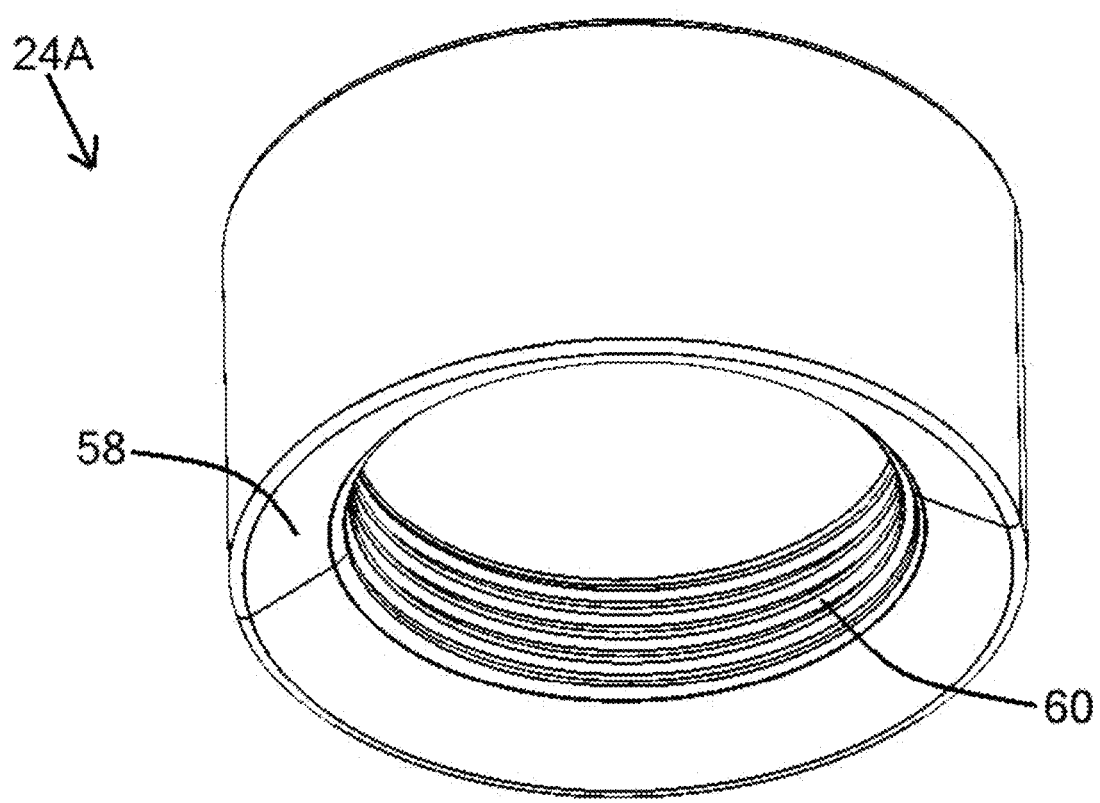
FIG. 9 illustrates a bottom perspective view of the bottle cap of FIG. 8.

Referring to FIGS. 8 and 9, a bottle cap 24A may be used with the bottle 22A, where the bottle cap includes lower female threads 60 that can mate with the male threads 44 about the open top 38A of the bottle 22A. Thus, the bottle cap 24A may be threaded onto the top of the bottle 22A to prevent leakage of contents from the bottle 22A. The bottle cap 24A can include an interior surface 54A that can seal over the open top 38A of the bottle 22A. While the interior surface 54A is shown as a flat sealing surface, in some embodiments, a fluid access mechanism may be employed as part of the bottle cap 24A. For example, a flip spout may be disposed in the interior surface 54A to permit a user to flip up the spout to access contents of the bottle 22A without having to remove the bottle cap 24A. A bottom surface 58 of the bottle cap 24A may be sloped to match the sloped surface 42 of the bottle 22A.

Similar to the bottle cap 24, an exterior 48A of the bottle cap 24A may be sized to match the exterior size of the upper portion 30A of the bottle 22A (which is exposed when the system 10 is assembled) as well as the exterior size of the sleeve 20, as shown in FIG. 1, where a continuous, uniform outer diameter may be provided for the system 10.

Figure 10:
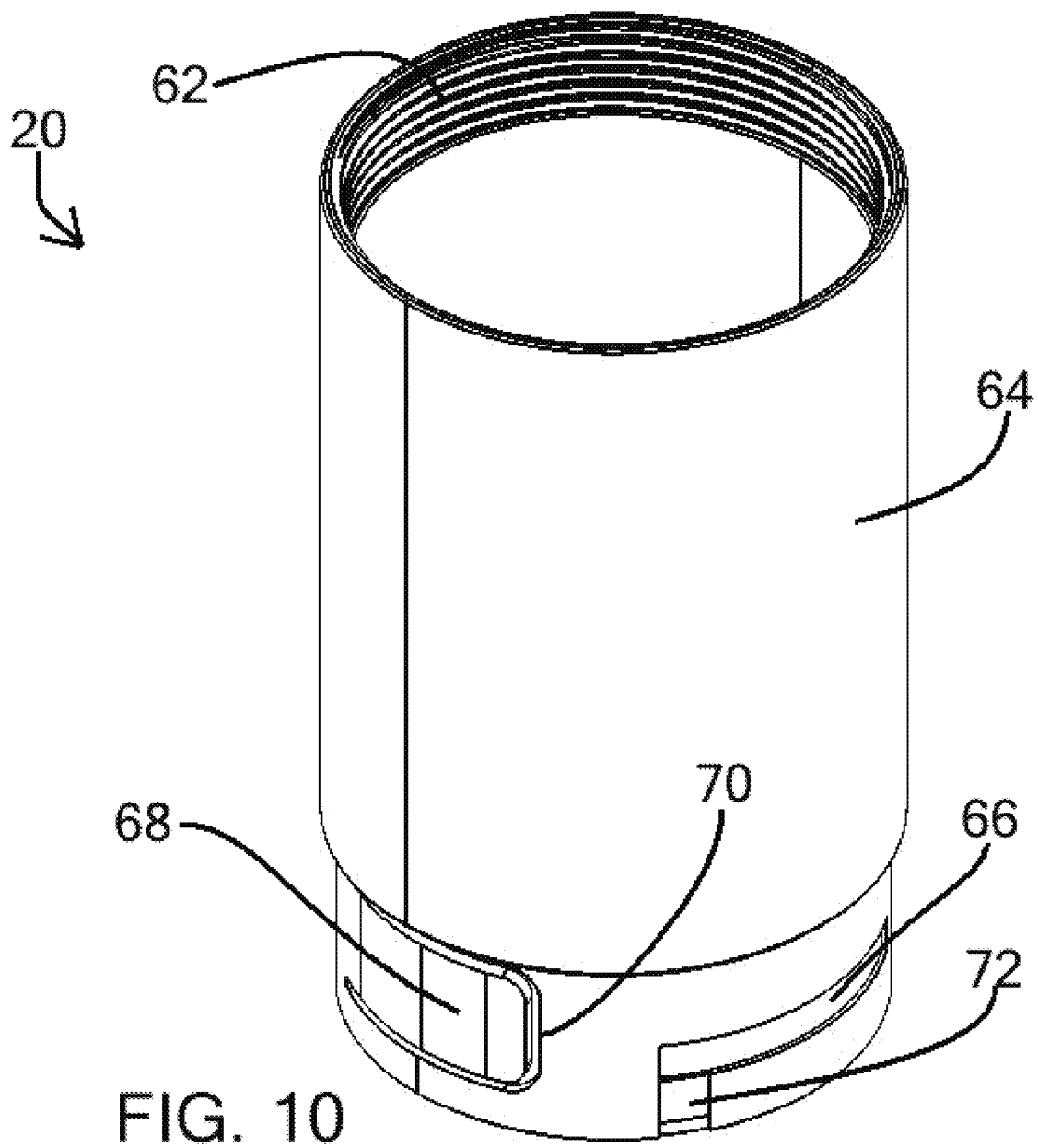
FIG. 10 illustrates a perspective view of a sleeve adapted to fit over a portion of the beverage bottle.
Figure 11:
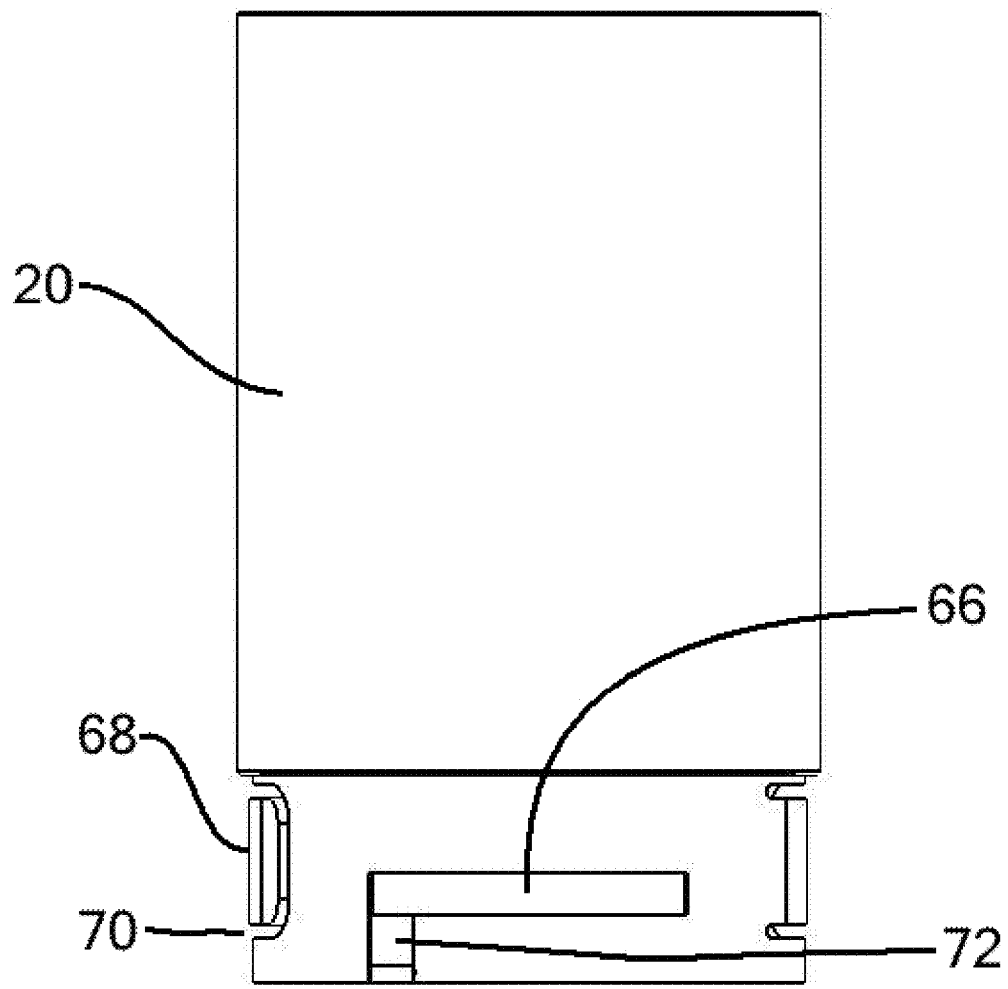
FIG. 11 illustrates a side view of the sleeve of FIG. 10.

Referring now to FIGS. 10 and 11, an exemplary embodiment of the sleeve 20 is shown. The sleeve can include female threads 62 can mate with the male threads 34, 34A on the bottle 22, 22A, permitting removable attachment thereto. The outer surface 64 of the sleeve 20 may extend to cover the lower portion 32, 32A of the bottle 22, 22A when assembled therewith.

Figure 12:
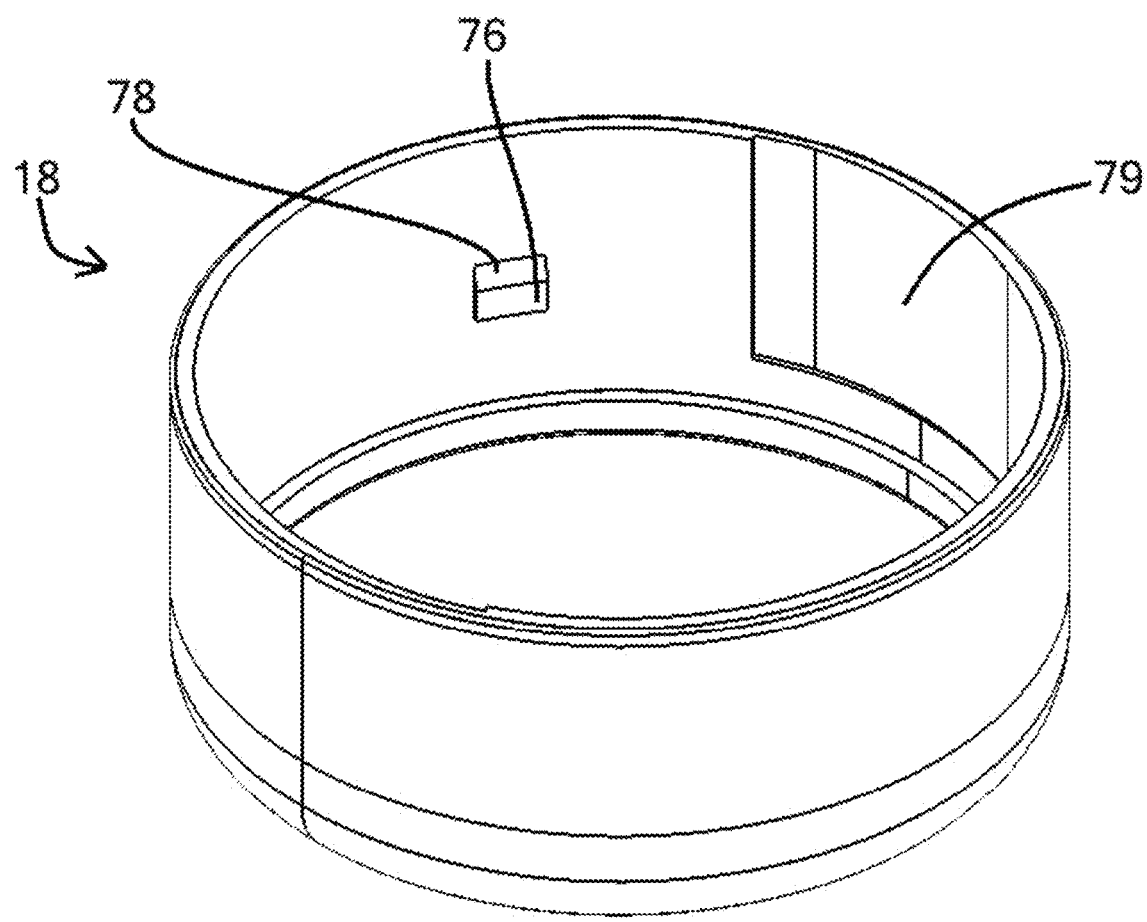
FIG. 12 illustrates a perspective view of a collet at least partially rotatable about a bottom of the sleeve of FIG. 10.
Figure 13:
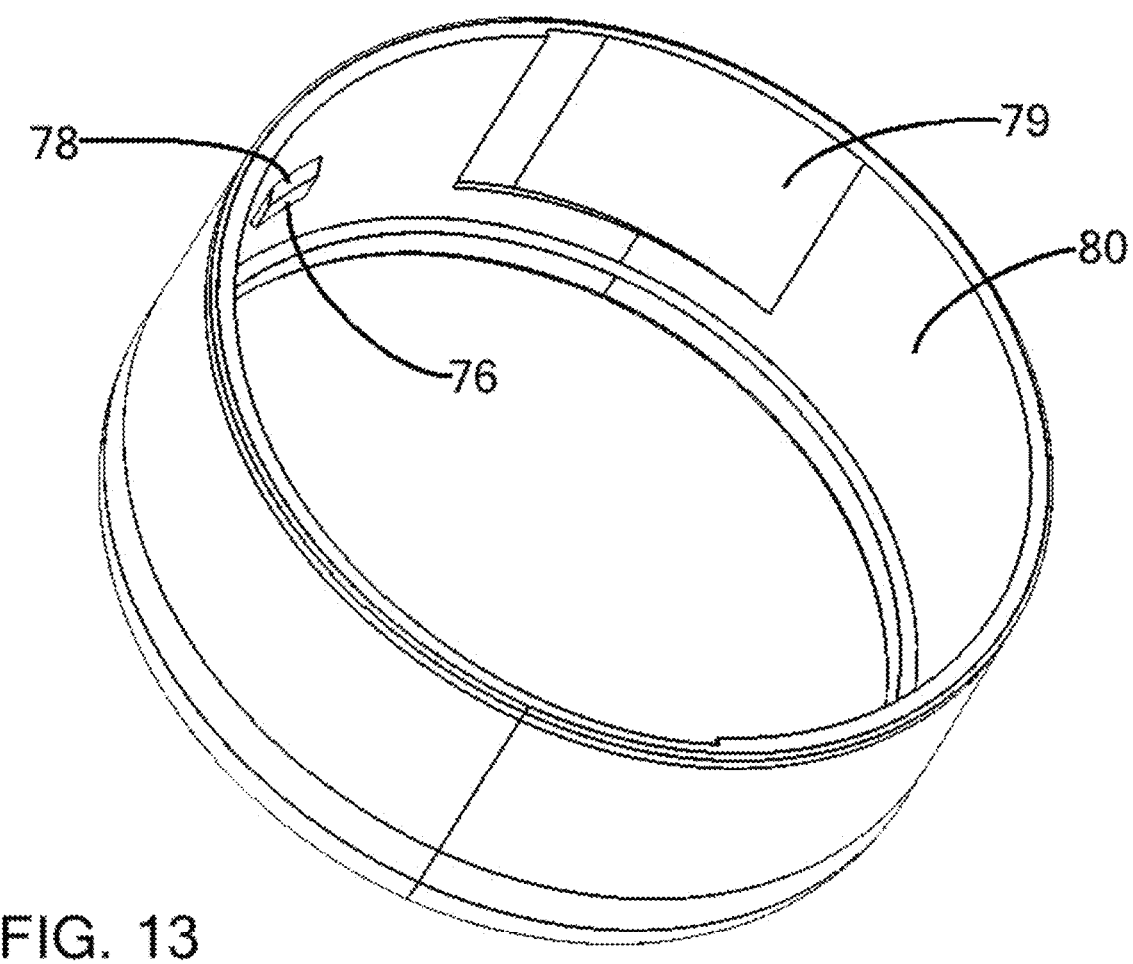
FIG. 13 illustrates another perspective view of the collet of FIG. 12.

In some embodiments, a bottom portion of the sleeve 20 may be configured with a movable tongue 68, separated from the remainder of the sleeve 20 by a channel 70. Further, the bottom portion of the sleeve 20 can further include a channel 66 formed along a portion of an outer circumference thereof. A raised portion 72 may communicate the channel 66 with the bottom of the sleeve 20. A collet 18, as shown in FIGS. 12 and 13, may fit onto the bottom of the sleeve 20, where an inside surface of the collet 18 can include a protrusion 76 having an upper sloped surface 78 and a ramped region 79. The protrusion 76 may be guided into the channel 66 by pressing the sloped surface 78 beyond the raised portion 72. The collet 18 may then rotate with the protrusion 76 sliding along the channel 66 during rotation thereof. The ramped region 79 may engage with the tongue 68 to cause the tongue 68 to move onto and out of an inside surface of the sleeve 20.

Thus, when the cup 12 is nested over the lower end 32, 32A of the bottle 22, 22A, and the sleeve 20 is assembled with the bottle 22, 22A, turning the collet 18 can cause the tongue 68 to press against the cup 12, holding the cup 12 in a stowed configuration. In should be understood that the collet may be optional and other mechanisms may be used to hold the cup 12 in the stowed position. Such mechanisms can include, for example, a bayonet lug, a twist lock, a friction fit, or the like. Regardless of specific mechanism, embodiments of the present invention permit storage of the cup so that the lower end 32, 32A of the bottle 22, 22A is disposed at least partially inside the cup 12.

Figure 14A:
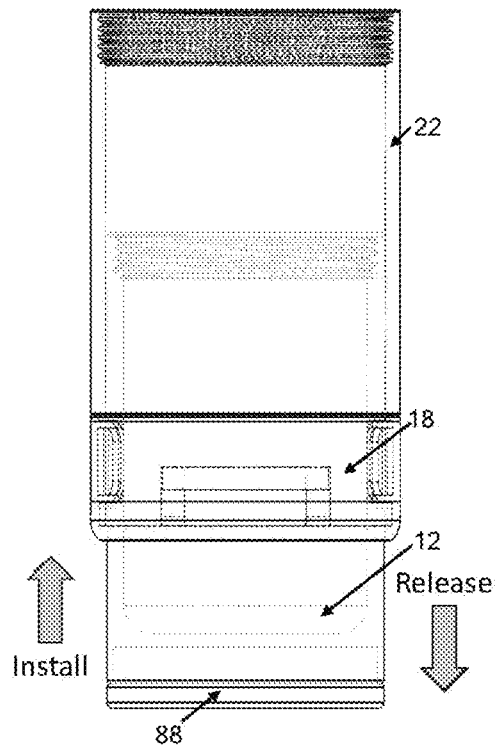
FIG. 14A is a side view of the cup partially removed from the beverage bottle.
Figure 14B:
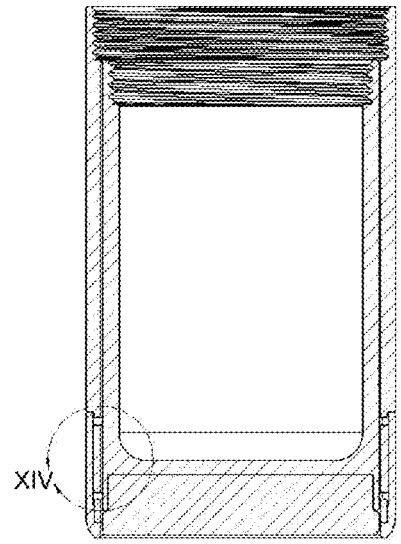
FIG. 14B is a cross-sectional side view of the cup nested about the beverage bottle.
Figure 14C:
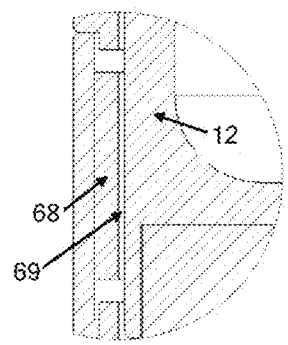
FIG. 14C is a detailed view taken along section XIV of FIG. 14A, showing the tongue of the sleeve spaced apart from the cup when the collet is turned in a cup release position.
Figure 15A:
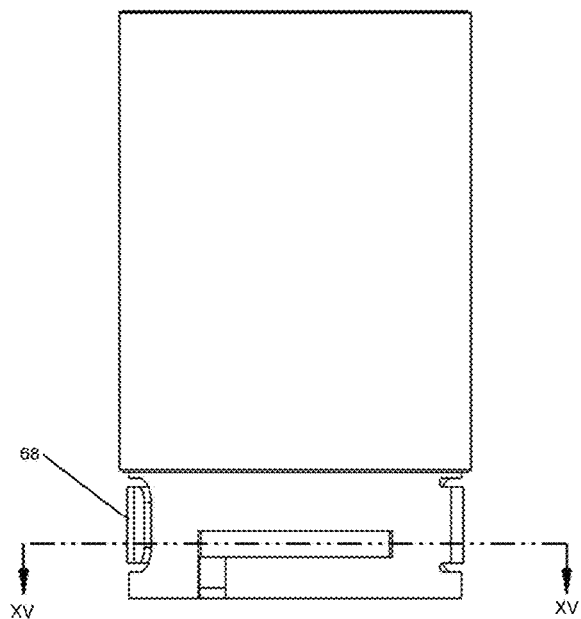
FIG. 15A is a side view of a sleeve of FIG. 10.
Figure 15B:
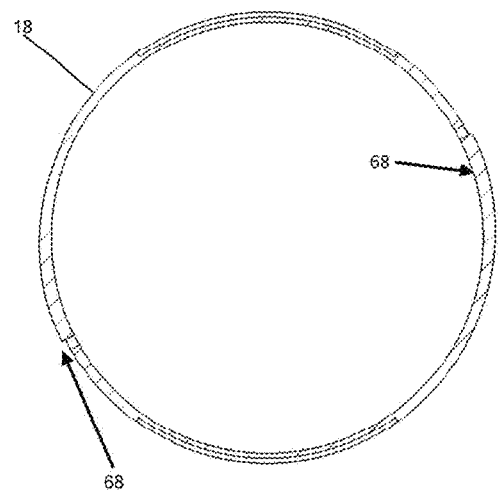
FIG. 15B is a cross-sectional view of the sleeve taken along line XV-XV of FIG. 15A, illustrating the tongue in a cup release position.
Figure 15C:
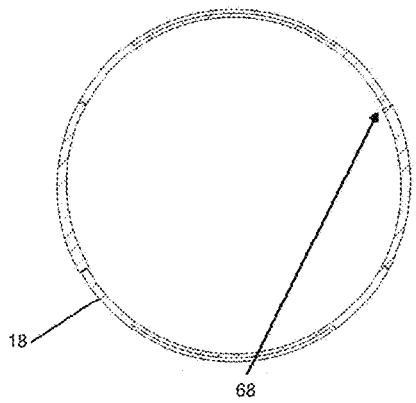
FIG. 15C is a cross-sectional view of the sleeve taken along line XV-XV of FIG. 15A, illustrating the tongue in a cup partially-secured position.
Figure 15D:
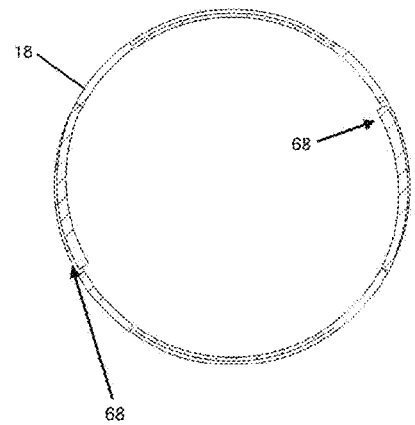
FIG. 15D is a cross-sectional view of the sleeve taken along line XV-XV of FIG. 15A, illustrating the tongue in a cup secured position.

Referring now to FIGS. 14A through 15D, the collet 18 may be turned with its protrusion 76 moving along the channel 66 to cause the tongue 68 to move between a cup-release position, where there is a space 69 between the cup 12 and the tongue 68 of the sleeve 20 as best illustrated in FIG. 14C. FIG. 15B illustrates this cup-release position, where the cup 12 may be gravity-released from its nested position about the beverage bottle. In FIG. 15C, the protrusion 76 may be in a middle position along the channel 66, where the tongue 68 is moved to slightly reduce the inside diameter of the sleeve 20. IN FIG. 15D, the protrusion 76 may be at a distal end of the channel 66, where the tongue 68 is depressed by the ramped region 79 of the collet 18 to cause the tongue 68 to press against the cup 12, retaining the cup in the nested position as shown in FIG. 15A.

Figure 16:
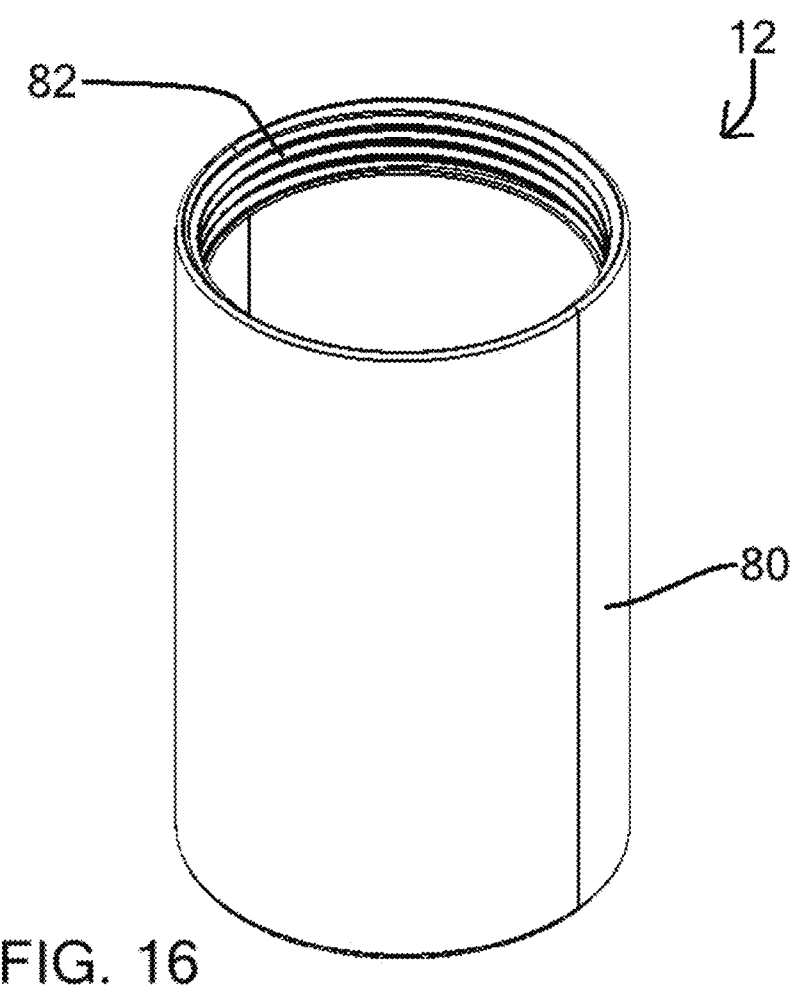
FIG. 16 illustrates a perspective view of the cup of FIG. 1.
Figure 17:
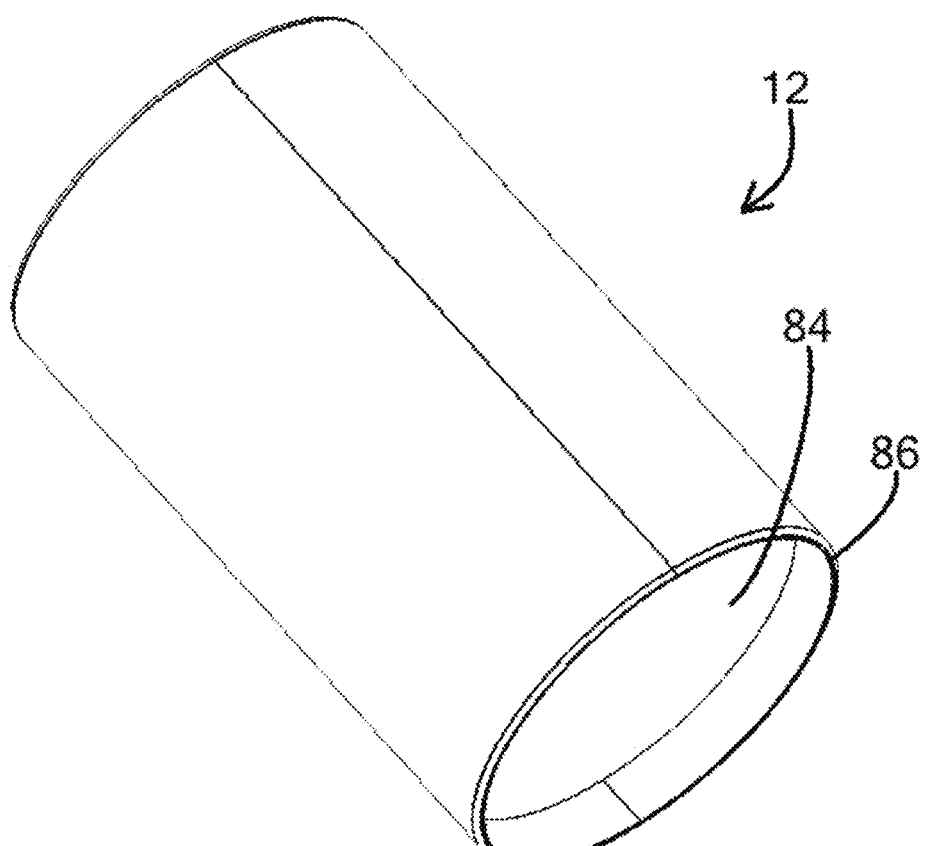
FIG. 17 illustrates a bottom perspective view of the cup of FIG. 16.

Referring to FIGS. 16 and 17, the cup 12 can include an outer surface 80 having an outer diameter that is smaller than an inside diameter of the sleeve 20. Female threads 82 may be disposed about an open top of the cup 12 to permit attachment of the cup cap 14. A base 84 of the cup 12 may be spaced away from the bottom 86 of the cup 12 such that a space is partially enclosed by the sides of the cup 12 at the bottom end thereof. A base member 88, as described in greater detail below, may be fit into this space at the bottom end of the cup 12.

Figure 18:
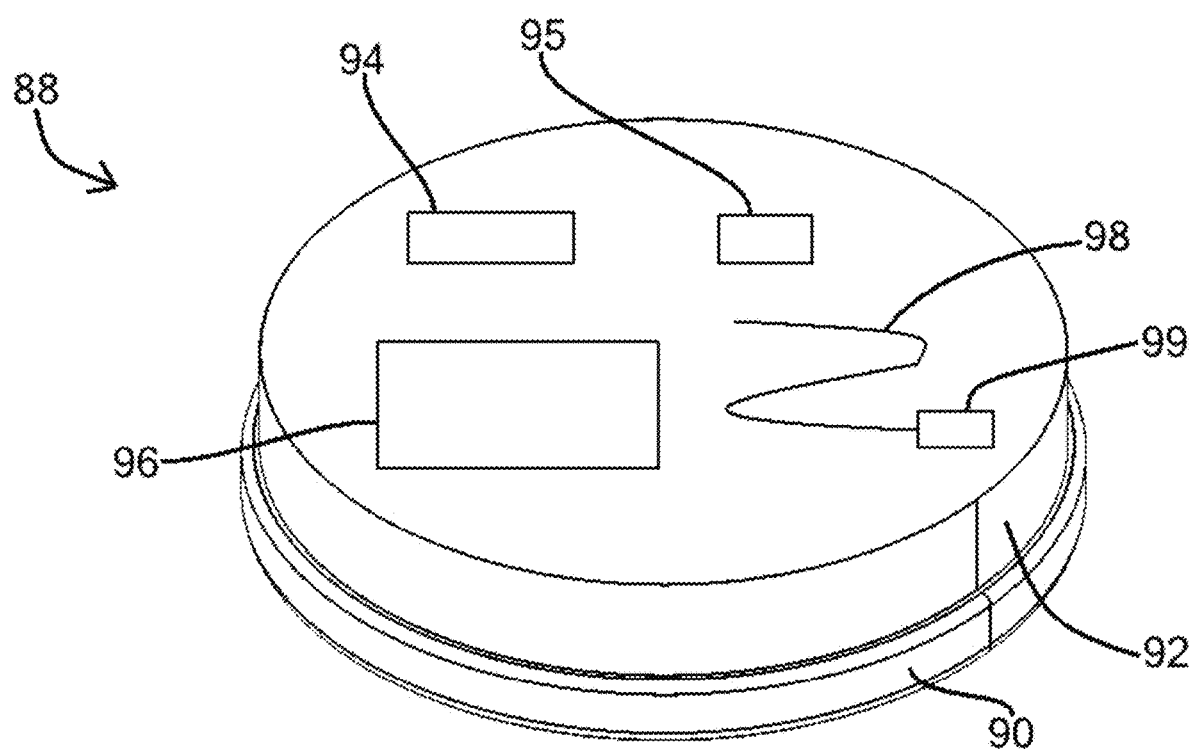
FIG. 18 illustrates a perspective view of a base member configured to fit onto a bottom of the cup of FIG. 16.

Referring to FIG. 18, the base member 88 of the cup 12 can include a reduced diameter portion 92 configured to fit into the space formed at the bottom of the cup 12. A larger diameter portion 90 may be configured to match the diameter of the cup 12, for example, and may extend below the bottom 86 of the cup 12 when assembled with the cup 12.

In some embodiments, the base member 88 can include electronic components, such as a battery pack 96 that may be charged via charge port 95. A cable (not shown) may connect the battery pack 96, via power port 94, to an electronic device to permit its charging. In some embodiments, a dongle 98 may be formed on an inner surface 97 of the base member 88, with a connector 99 formed on its end. The connector 99 may be designed to connect to an electronic device for its charging from the battery pack 96.

In some embodiments, the ports 94, 95 may be disposed on the inner surface 97 of the base member 88, thereby protecting the ports. However, in other embodiments, the ports 94, 95 may be disposed on the outside of the base member 88, thereby permitting electronic device charging without the need to remove the base member 88 from the cup 12.

Figure 19:
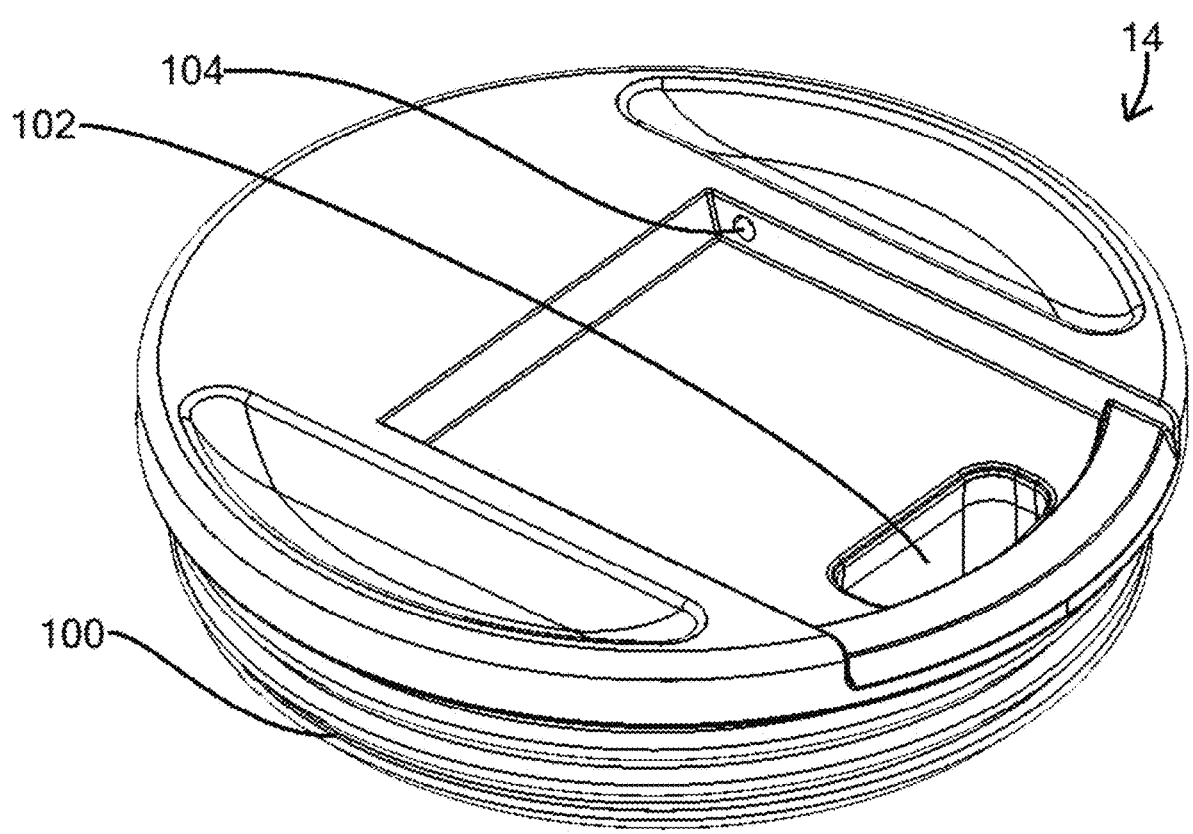
FIG. 19 illustrates a perspective view of a cup lid configured to fit onto a top of both the cup and the top of the beverage bottle caps of FIGS. 7 and 8.
Figure 20:
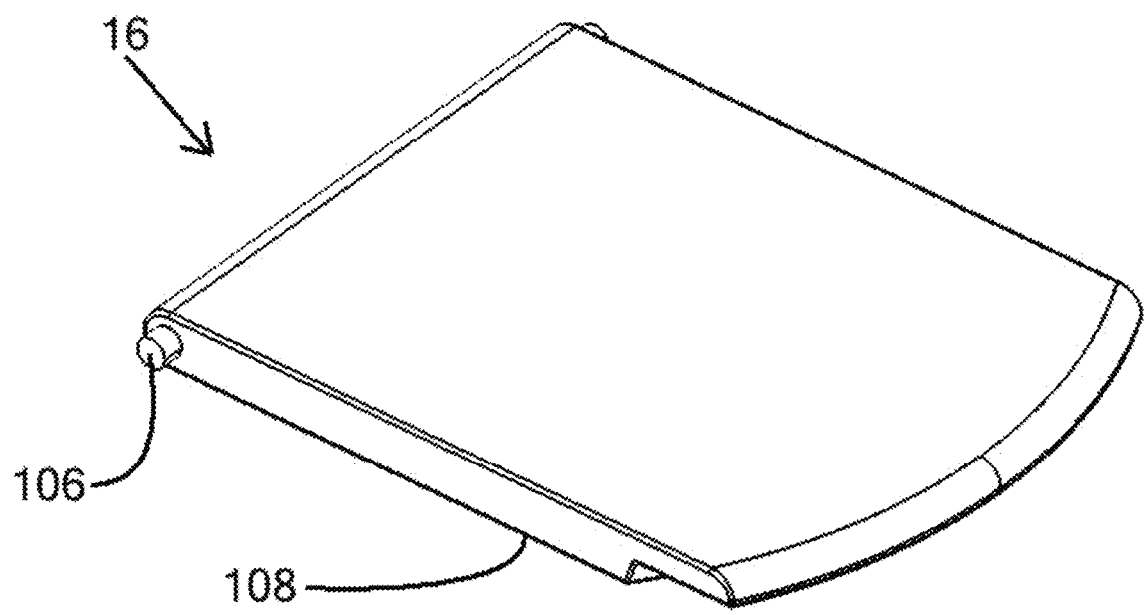
FIG. 20 illustrates a perspective view of a lid movable to permit access to fluid in the cup.

Referring to FIGS. 19 and 20, the cup cap 14 can include male threads 100 that may engage with the female threads 82 of the cup 12. A fluid port 102 may permit movement of fluid from the cup 12 to the user. A port cover 16 can have a sealing surface 108 that can selectively cover the fluid port 102 or be removed therefrom. In some embodiments, the port cover 16 can include pins 106 that engage with holes 104 in the cup cap 14 to permit pivoting of the port cover 16. While the Figures show one exemplary embodiment of the port and cover, it should be understood that various covers may be used to selectively cover the fluid port in the cup cap. For example, the cover could be a slide cover or the like.

Figure 21A:
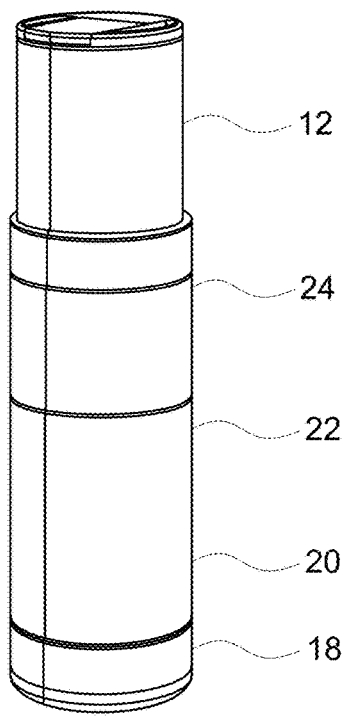
FIG. 21A is a side view showing the cup disposed on a top end of the beverage bottle according to an exemplary embodiment of the present invention.
Figure 21B:
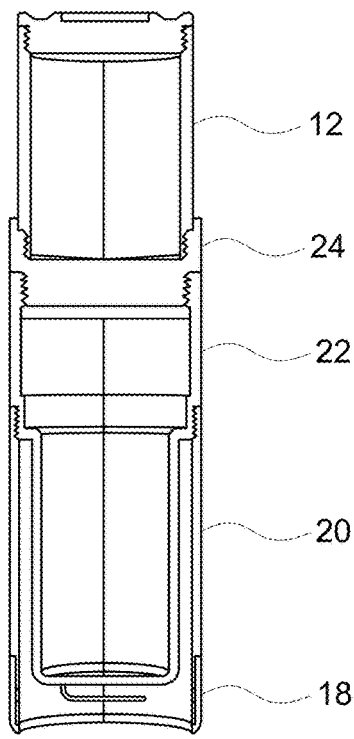
FIG. 21B is a cross-sectional view of the cup top-mounted configuration of FIG. 21A.

As discussed above, the cup 12 may be mounted at the top of the bottle cap 24, 24A. FIGS. 21A and 21B shows an example of such a configuration. Various mechanisms may be used to secure the cup 12 into the top of the bottle cap 24, 24A, including, but not limited to a friction fit, one or more magnets, a snap-fit, a twist lock, a tilt lock, a click-fit, or the like. Such a connection would be considered appropriate provided that the cup 12 may not readily fall out from the bottle cap 24, 24A, while the user may be able to remove the cup 12 (for placement into the stored, nested position, for example) without undue effort.

Figure 22A:
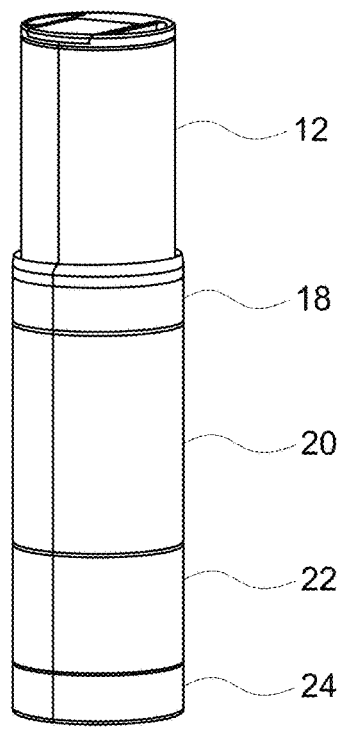
FIG. 22A is a side view showing the cup disposed on a bottom end of the beverage bottle according to an exemplary embodiment of the present invention.
Figure 22B:
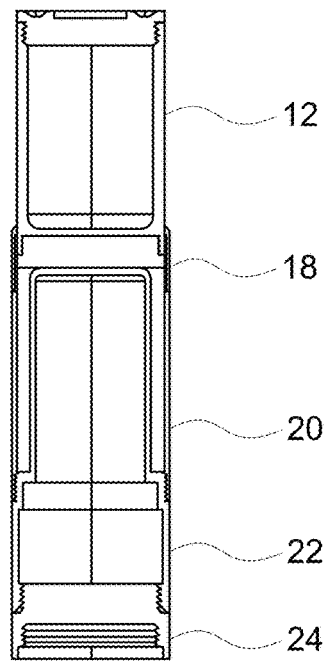
FIG. 22B is a cross-sectional view of the cup bottom-mounted configuration of FIG. 22A.

As discussed above, the cup 12 may be mounted from the bottom of the sleeve 20, typically retained by, for example, the action of the collet 18, as discussed above. Such a configuration is shown in FIGS. 22A and 22B. Other mechanisms for securing the cup 12 to the bottom of the sleeve 20 may be utilized, such as magnets, a twist lock, a friction fit, or the like.

It should be understood that while male and female threads have been described to provide connection between various members, other connection mechanisms may be used provided that the function remains. For example, the cup cap 14 may include a plurality of resilient sealing members that extend about its outer diameter (at a similar location of the male threads 100) that may be inserted into the cup 12 to frictionally sealingly engage therewith. In some embodiments, the threaded engagement between the sleeve 20 and the bottle 22, 22A may be either a different type of connection or may be replaced with a permanent connection.

As shown in the Figures, the outer diameter of the cup 12 may be constant about its length. Thus, once removed via the collet 18, the bottom of the cup 12 may be inserted into the sleeve 20 and the collet 18 tightened to attach the cup 12 to the bottom of the sleeve 20, where a user may drink from the cup 12, or close the port cover 16, turn the system 10 over, remove the bottle cap 24, 24A and drink from the bottle 22, 22A.

In some embodiments, the base member 88 or the bottom end of the cup 12 may be designed to fit into the top of the bottle cap 24, 24A once the cup cap 14 is removed therefrom and placed on the cup 12. Various connection mechanisms may be used to connect the base member 88 and/or the bottom of the cup 12 with the bottle cap 24, 24A, such as a friction fit, a threaded connection, a twist lock, a pin and slot, or the like. Regardless of the connection mechanism, once connected, a user can drink from the cup 12 by moving the cover 16 to reveal the fluid port 102 to permit fluid to pass from the cup 12. Further, the user can drink from the bottle 22, 22A by removing the bottle cap 24, 24A therefrom and drinking from the open end of the bottle 22, 22A. The bottle cap 24, 24A may be removed with or without removing the cup 12 from the bottle cap 24, 24A.

Figure 23:
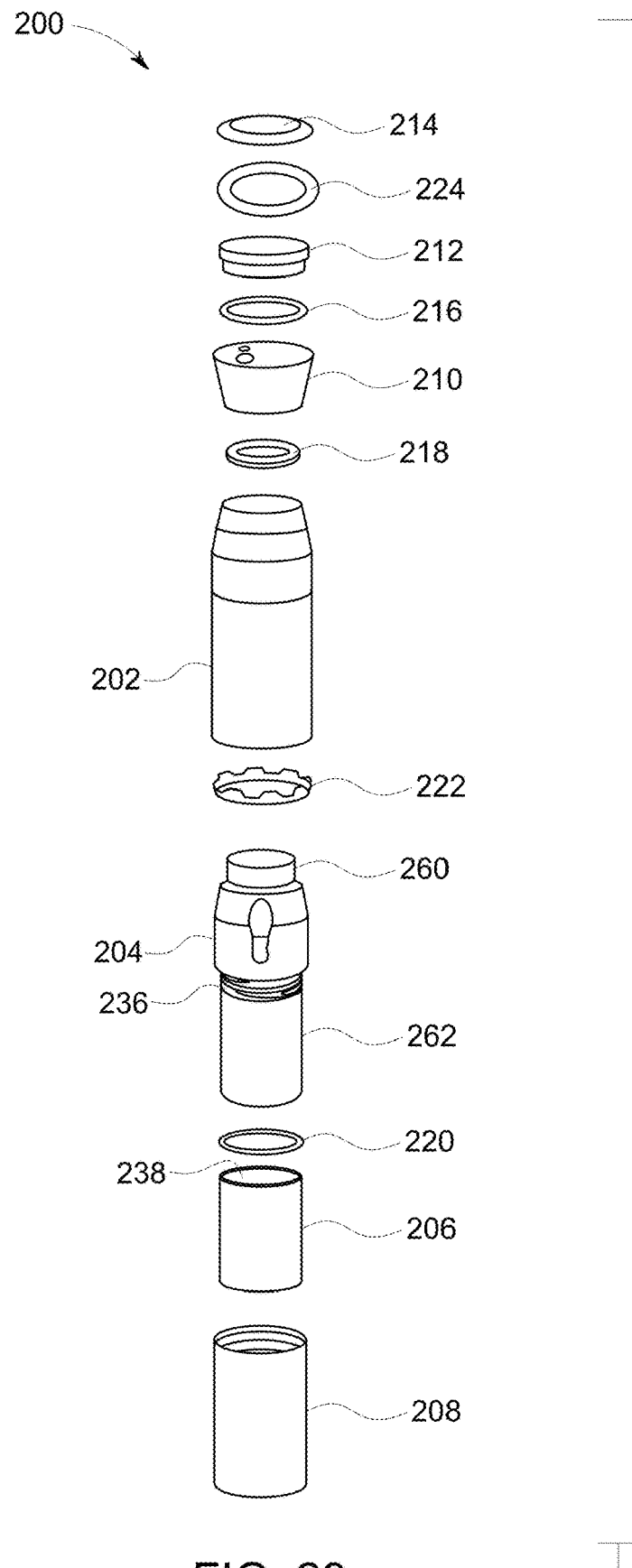
FIG. 23 is an exploded view of a container system according to an exemplary embodiment of the present invention.

Referring to FIG. 23, an exploded view illustrating components of container system 200 is shown. Details of each component, as well as exemplary configurations of the components, are described in greater detail below.

The container system 200 can include an external shell 202. A vessel 204 can be disposed within the shell 202, with a male threaded end 260 (also referred to as male threads 260) can extend out of the shell 202 when the vessel 204 is assembled with the shell 202.

A vessel lid 210 can threadably engage the threads 260 of the vessel 202. An o-ring 218 can be disposed between the vessel lid 210 and the vessel 202 for sealing the components. A cup lid 212, with an o-ring 216, can engage with the vessel lid 210. A plug 214 can engage with the cup lid 212. The plug 214 may retain a straw 224 thereunder. The straw 224 may be straightened and inserted in a hole in the cup lid 212 to permit drinking therethrough.

A cup 208 can at least partially nest with a lower portion 262 of the vessel 204. Male threads 236 on the outside of the vessel 204 can engage with female thread 238 inside the open end of the cup 208 to engage the cup 208 with the vessel 204 in the nested/stored arrangement. An o-ring 220 can be used to seal the cup 208 to the vessel 204. In some embodiments, the lower portion 262 of the vessel 204 can be encased with a wrap, such as a silicone wrap 206 to help guide the cup 208 onto the vessel 204 and to further prevent metal-on-metal sounds during removal or replacement of the cup 208 from or to the nested configuration.

Figure 24A:
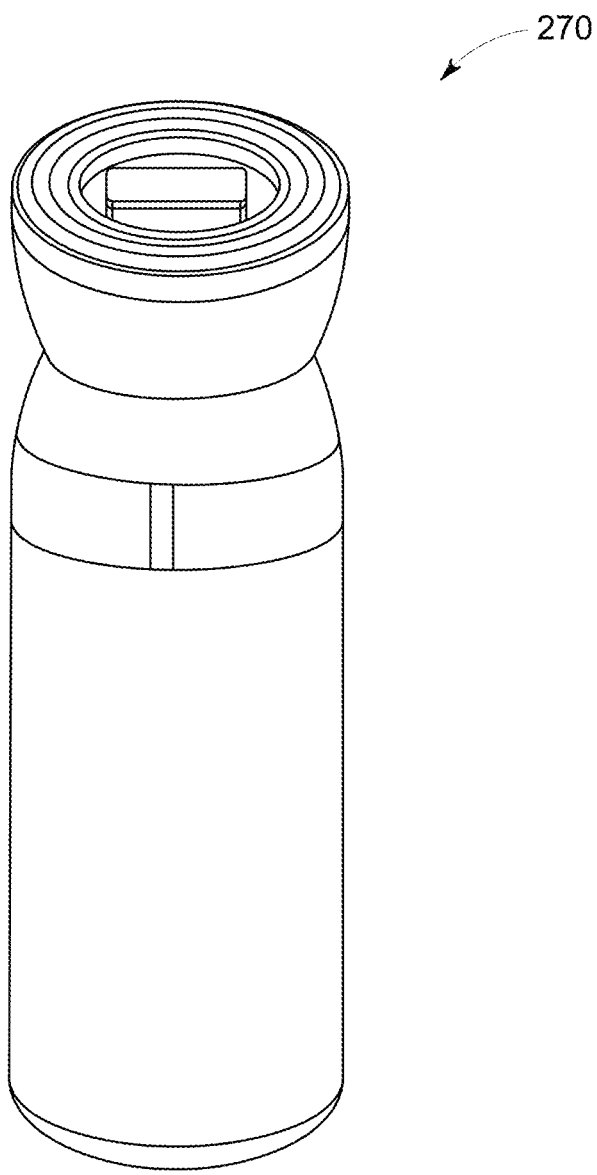
FIGS. 24A and 24B illustrate one configuration of the container system of FIG. 23.
Figure 24B:
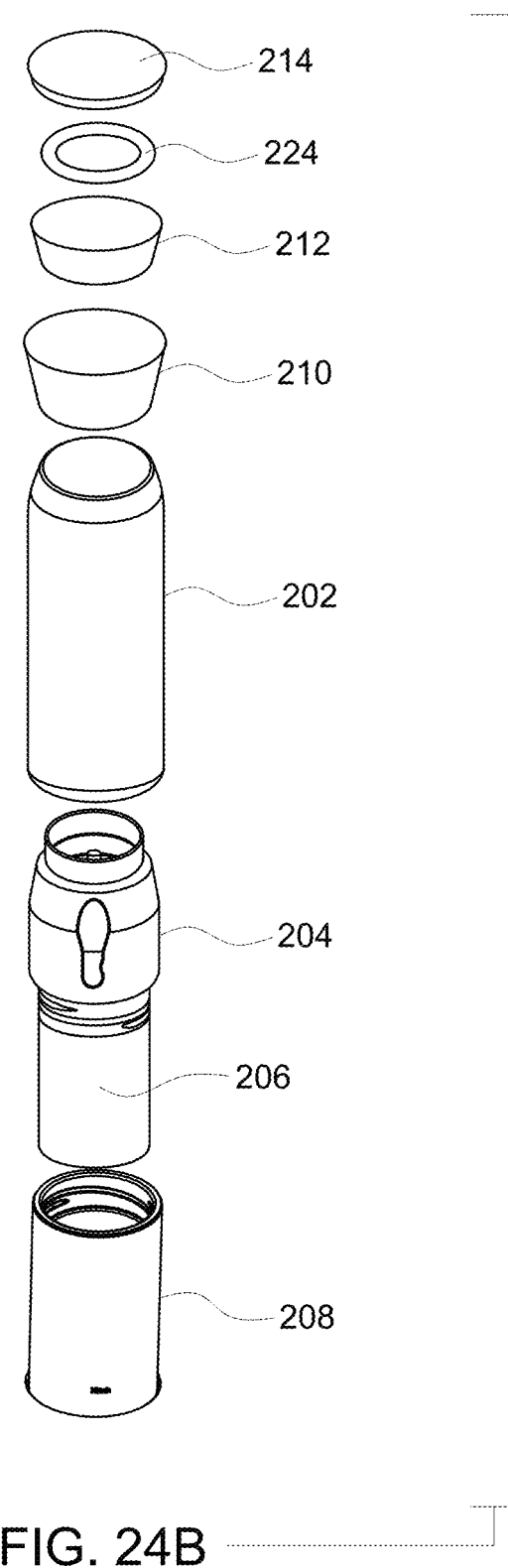

FIGS. 24A and 24B illustrate a top level assembly configuration 270. This is typically the form in which the container assembly 200 is packaged for sale and where the container assembly may be carried. It should be noted that the shape of the shell 202 and the vessel lid 210 may form a concave shaped exterior for ease of one-handed carry.

Figure 25A:
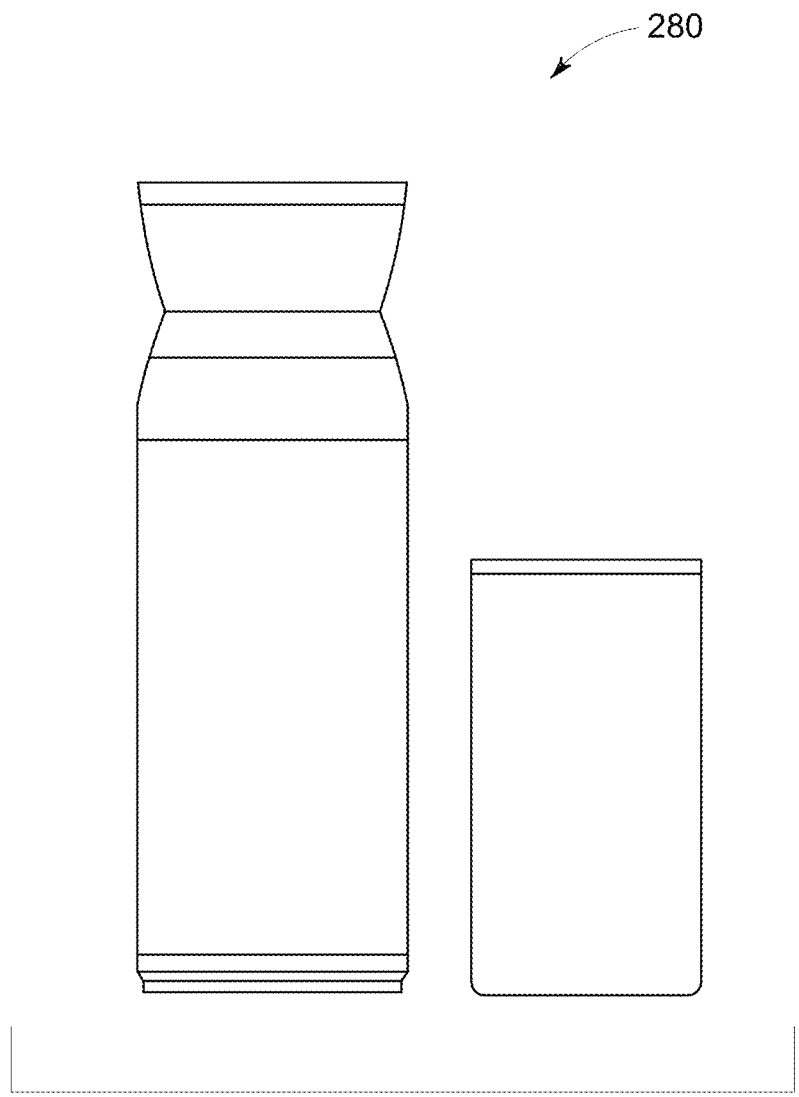
FIGS. 25A and 25B illustrate another configuration of the container system of FIG. 23.
Figure 25B:
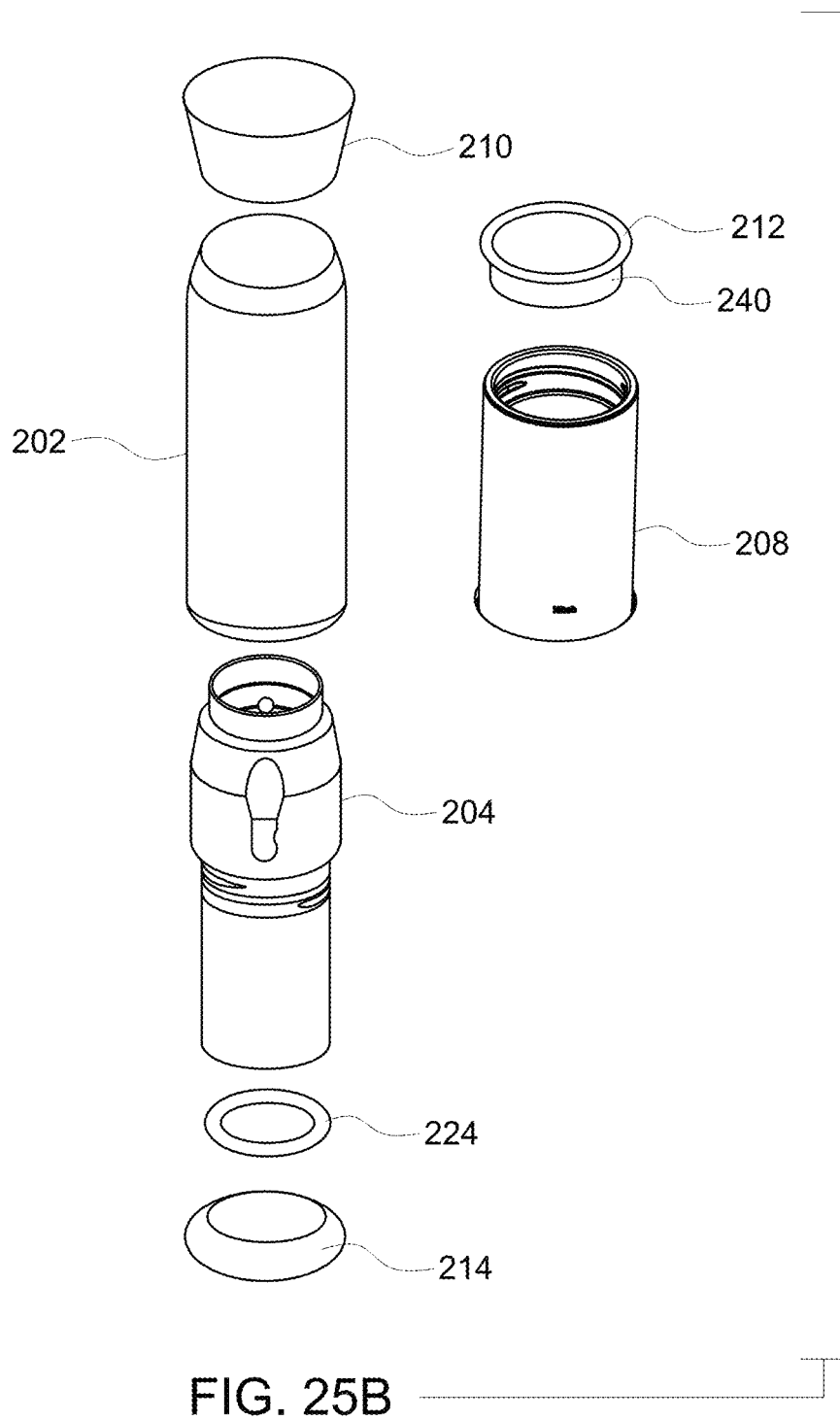

FIGS. 25A and 25B illustrate a configuration 280 where the vessel 204 and the cup 208 are separated for individual use. In this configuration, the cup lid 212 can be removed from the vessel lid 210, as described in greater detail below, and placed on the cup 208. Male threads 240 on the cup lid 212 can mate with the threads 238 of the cup 208 (which were previously engaged, in the configuration 270 of FIGS. 24A and 24B, to the threads 236 of the vessel 204). The vessel lid 210 can remain on the vessel 204 and may be removed (unscrewed) for access inside the vessel 204. In this embodiment, the plug 214 can be moved from the vessel lid 210 to the bottom of the shell 202. In this configuration 280, the vessel 204 can be used for one beverage and the cup 208 may be used for a second beverage.

Figure 26A:
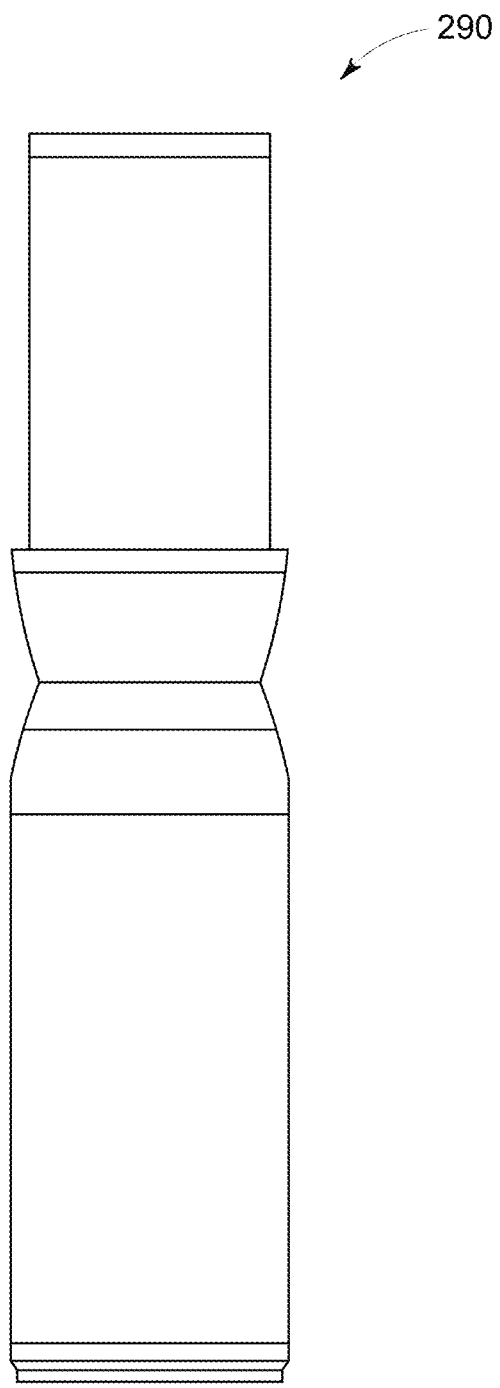
FIGS. 26A and 26B illustrate another configuration of the container system of FIG. 23.
Figure 26B:
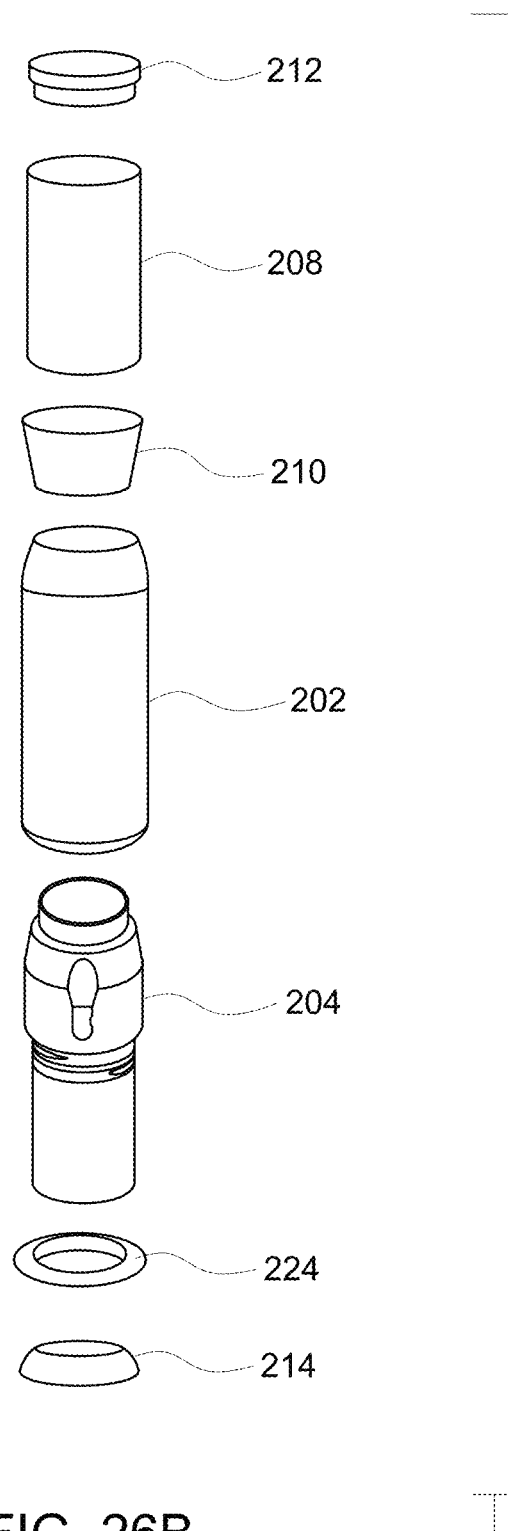

FIGS. 26A and 26B illustrate a configuration 290 where the cup 208 can be stored on top of the vessel lid 210. Details of the engagement between the bottom of the cup 208 and the vessel lid 210 are described in detail below. In this embodiment, the plug 214 can be moved from the vessel lid 210 to the bottom of the shell 202. Like the previous configuration 280, in this configuration 290, the vessel 204 can be used for one beverage and the cup 208 may be used for a second beverage, and the cup 208 and vessel 204 can be interconnected for ease of transport.

Figure 27:
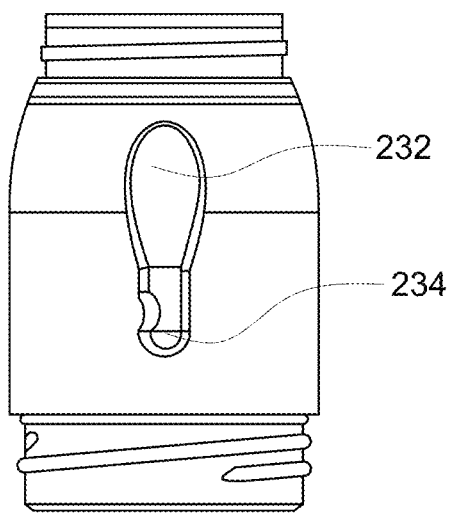
FIGS. 27 and 28 illustrates a shell to vessel engagement of the container system of FIG. 23.
Figure 28:
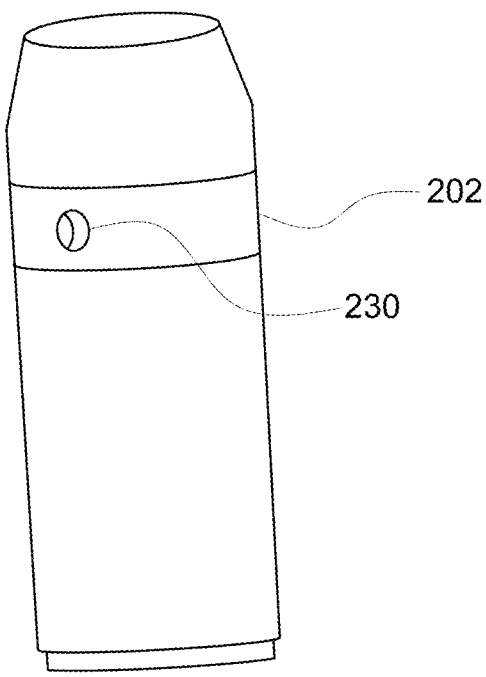

FIGS. 27 and 28 illustrate an exemplary connection mechanism for joining the vessel 204 with the shell 202. The shell 202 can include a spring-loaded ball 230 that may partially extend outward from an inner wall of the shell 202. The ball 230 can engage a slot 232 of the vessel 204 as the vessel is slid into the shell 202. A pocket 234 may be disposed at the end of the slot 232 where the ball 230 can engage therein to hold the shell 202 and the vessel 204 together. This configuration can be strong enough to prevent inadvertent separation of the shell 202 and the vessel 204, while permitting separation thereof for cleaning or the like. While one ball 230/slot 232/pocket 234 is shown, in some embodiments, such configurations may be disposed about the circumference of the shell 202 and vessel 204. Thus, two, three, four, or more, of such assemblies may be used to provide the desired engagement. Typically, when more than one ball/slot/pocket assembly are used, they are spaced apart equally to permit assembly in different angular orientations.

Figure 29:
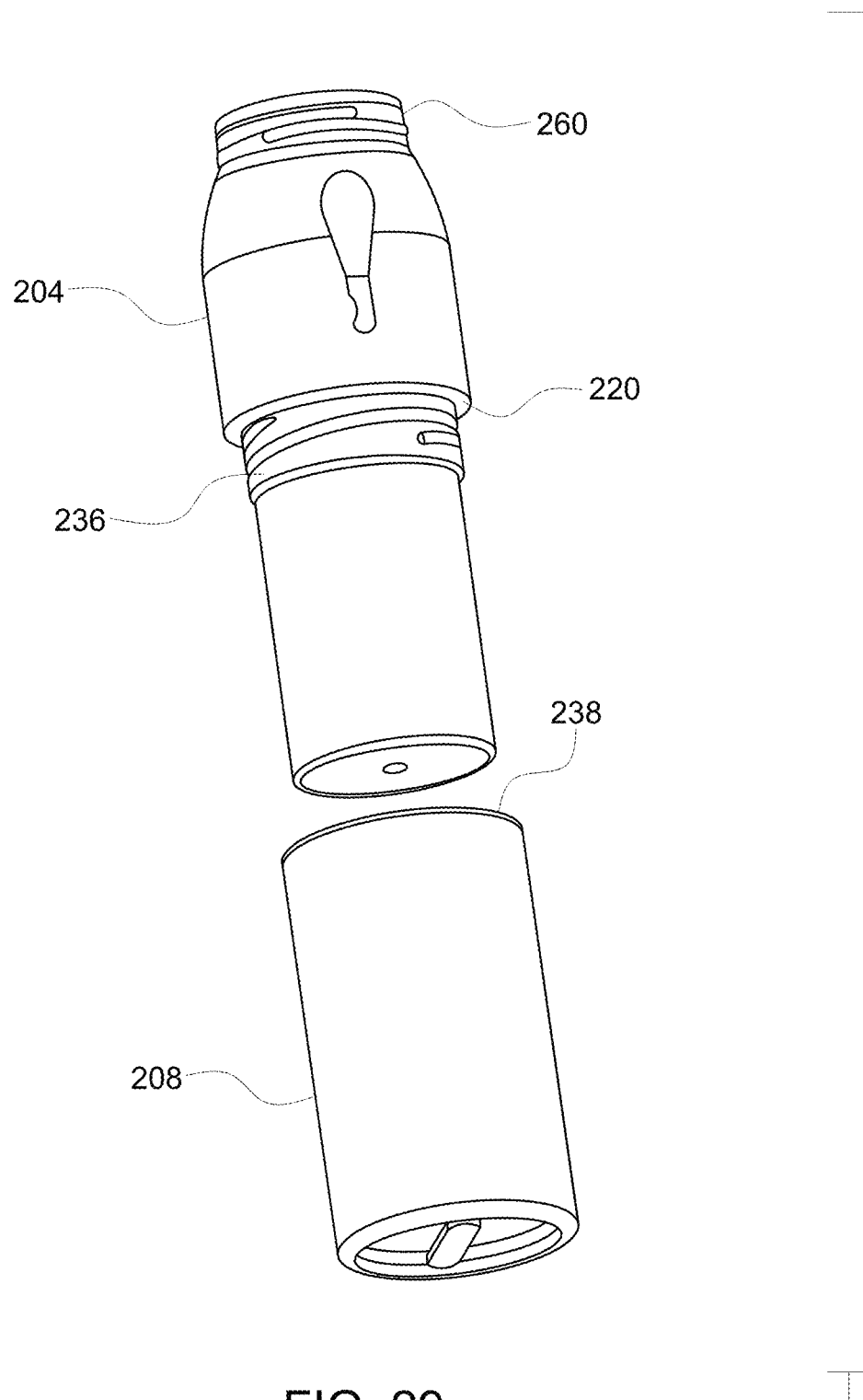
FIG. 29 illustrates a cup to vessel engagement of the container system of FIG. 23.

FIG. 29 illustrates a detailed view of the assembly between the cup 208 and the vessel 204. As discussed above, threads 236 on the vessel 208 can engage with female threads 238 inside the open end of the cup to join the two components together. An o-ring 220 can be used to provide a seal for this engagement.

Figure 30:
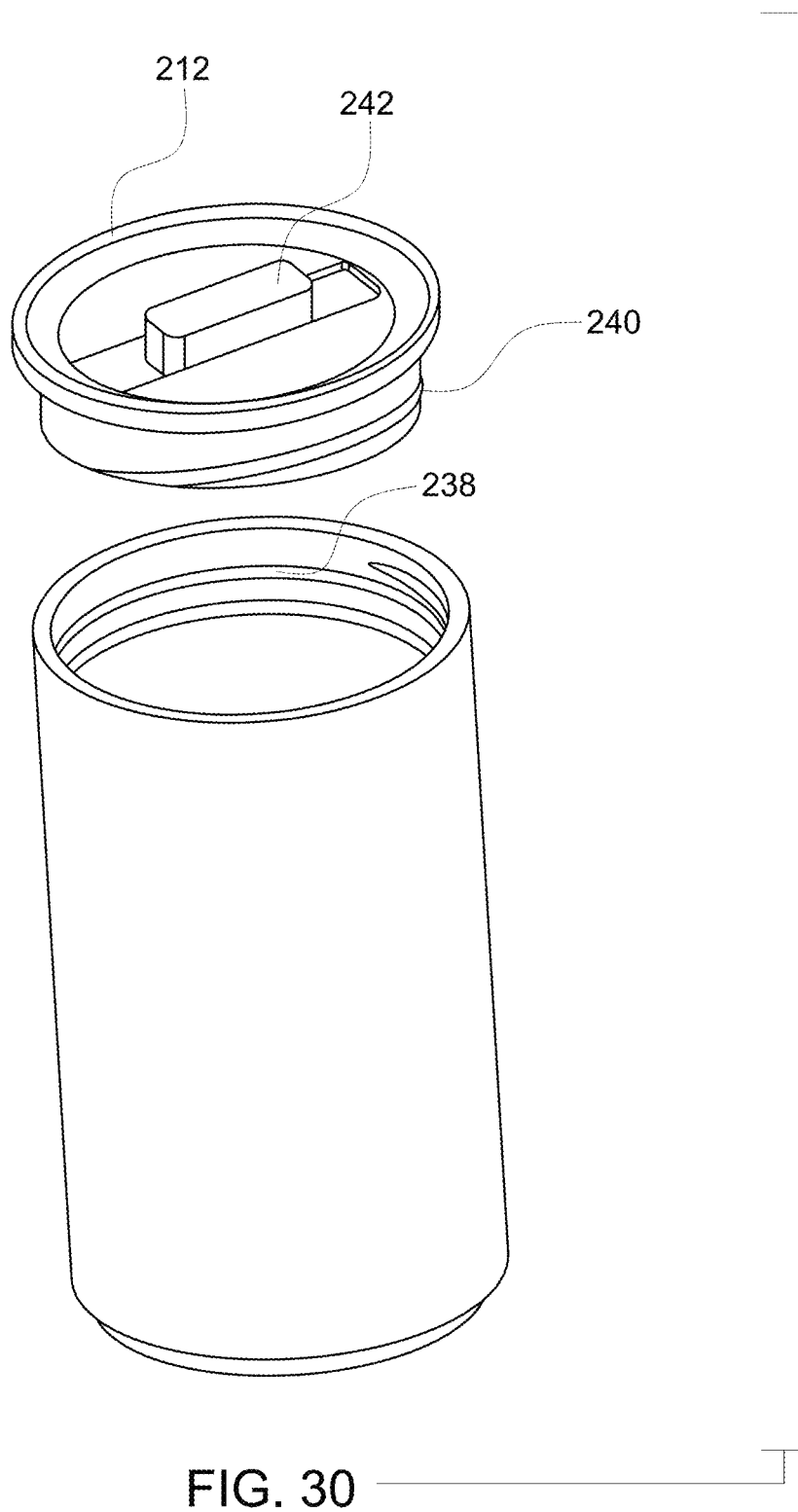
FIGS. 30 and 31 illustrate a cup lid to cup engagement of the container system of FIG. 23.
Figure 31:
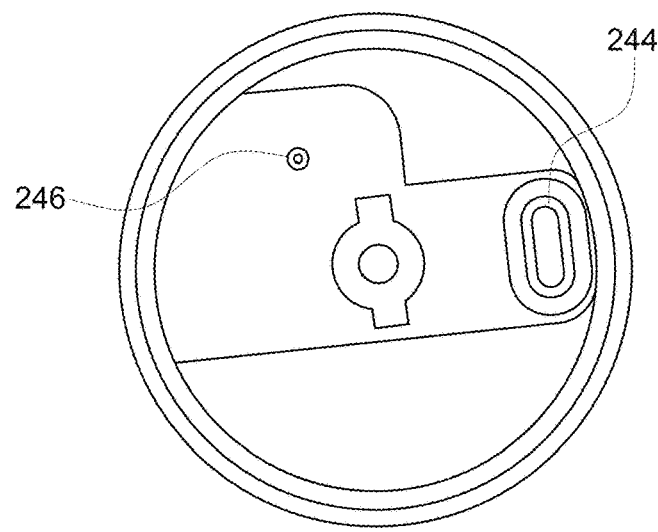

FIGS. 30 and 31 illustrate the engagement between the cup lid 212 and the cup 208. The cup lid 212 can include male threads 240, which are the same as the threads 236 on the vessel 208, described above. These threads 240 can engage the female threads 238 of the cup. The cup lid 212 can include a mechanism, such as a slide 242, to open and close a beverage drinking hole 244 formed in the cup lid 212. A seal, such as an o-ring, may be used to seal the slide 242 with the hole 242 when the slide 242 is in a closed configuration. A vent hole 246 may also be present on the cup lid 212, which may also seal closed to prevent leakage when not needed to vent steam, for example.

Figure 32:
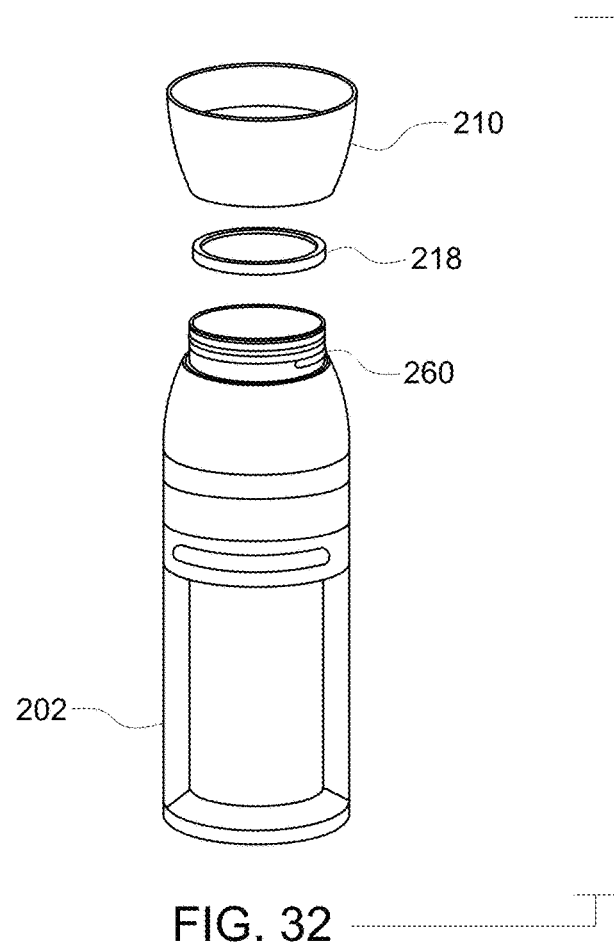
FIG. 32 illustrates an engagement between the vessel and the vessel lid of the container system of FIG. 23.

FIG. 32 illustrates the engagement between the vessel 204 (inside shell 202) and the vessel lid 210. The vessel lid 210 can include female threads (not shown) that can engage the male threads 260 of the vessel 204. An o-ring 218, or the like, can be used to provide a seal between the vessel lid 210 and the vessel 204.

Figure 33:
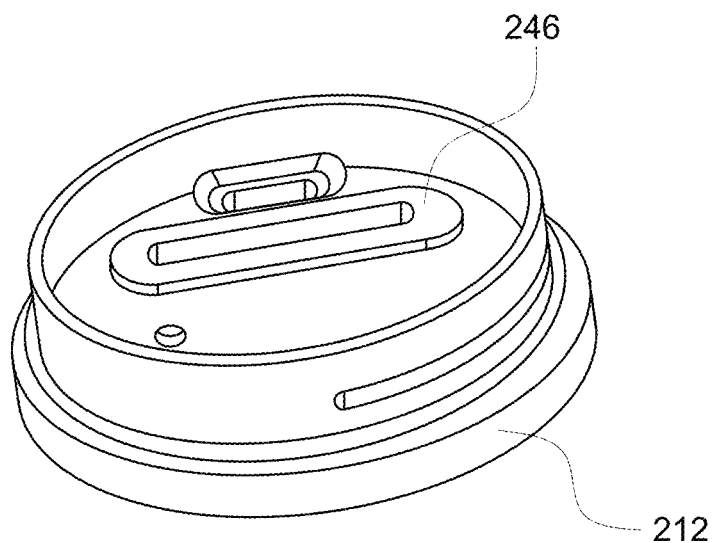
FIGS. 33 and 34 illustrate a cup lid to vessel lid engagement of the container system of FIG. 23.
Figure 34:
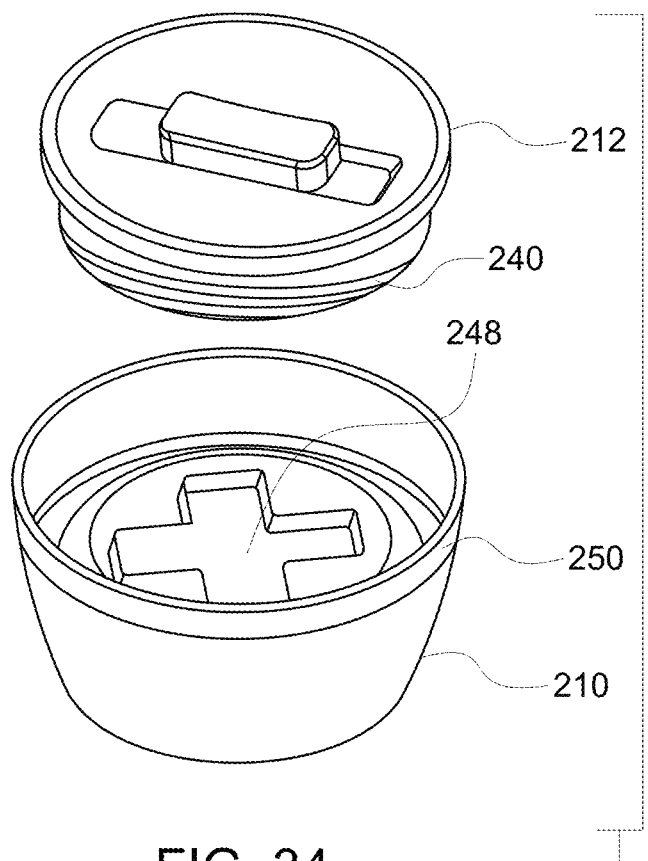

FIGS. 33 and 34 illustrate an engagement between the cup lid 212 and the vessel lid 210. In some embodiments, the vessel lid 210 can include female threads (not shown) to engage the male threads 240 of the cup lid 212. In an alternate embodiment, the cup lid 212 can include a crossbar 246, which is disposed as a flattened elongated member, attached at a center to the underside of the cup lid 212 and separated a distance from the underside of the cup lid 212. A cross cutout 248 may be formed on an inner surface of the vessel lid 210 so that the crossbar 246 can fit into the cross cutout 248 and where turning the vessel lid 210 relative the cup lid 212 can lock the crossbar 246 at least partially into the cutout 248. Typically, a turn of 45 degrees may fully provide this engagement. In some embodiments, a stop 250 may be disposed inside the cutout 248 to stop the ability to twist the connection beyond a 45 degree twist, thus ensuring proper connection between the components.

Figure 35:
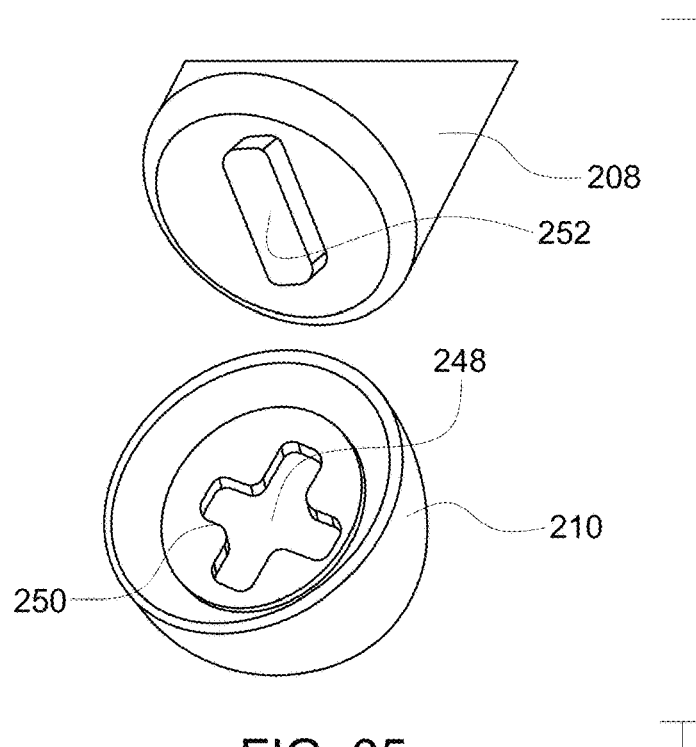
FIG. 35 illustrates a cup to vessel lid engagement of the container system of FIG. 23.

FIG. 35 illustrates an engagement between the bottom of the cup 208 to the vessel lid 210. As discussed above, the vessel lid 210 can include the cutout 248 with an optional 45 degree stop 250. A crossbar 252, like crossbar 246, discussed above, can be disposed on the bottom of the cup 208. Thus, a simple 45 degree twist of the cup 208 with the vessel lid 210 can provide an engagement therebetween. As can be seen in FIG. 35, the shape of the base of the cup 208 can fit with the inside shape of the vessel lid 210 to provide the interconnection as shown in the configuration 290 described above with respect to FIGS. 26A and 26B.

Figure 36:
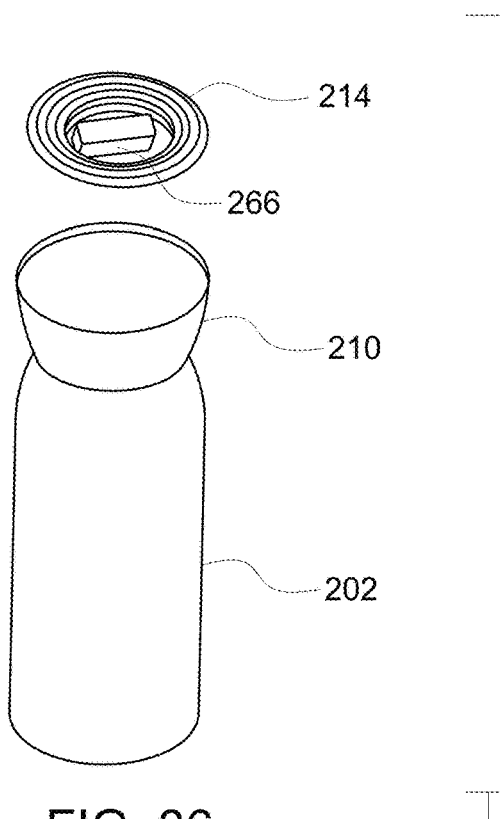
FIGS. 36 and 37 illustrate a plug to shell and a plug to vessel lid of the container system of FIG. 23.
Figure 37:
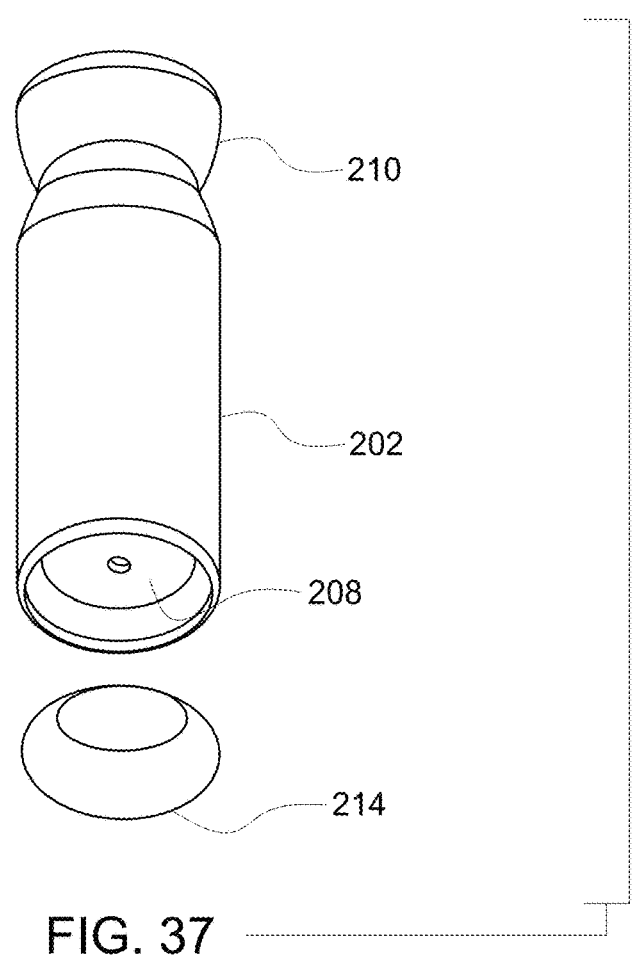

FIGS. 36 and 37 illustrate an engagement between the plug 214 and the vessel lid 210 (FIG. 36) or the shell 202 (FIG. 37). Typically, an interference fit may be used to engage the plug 214 with either the vessel lid 210 of the shell 202. A recessed finger hold 266 may be provided to assist with placement and removal of the plug 214.

Figure 38:
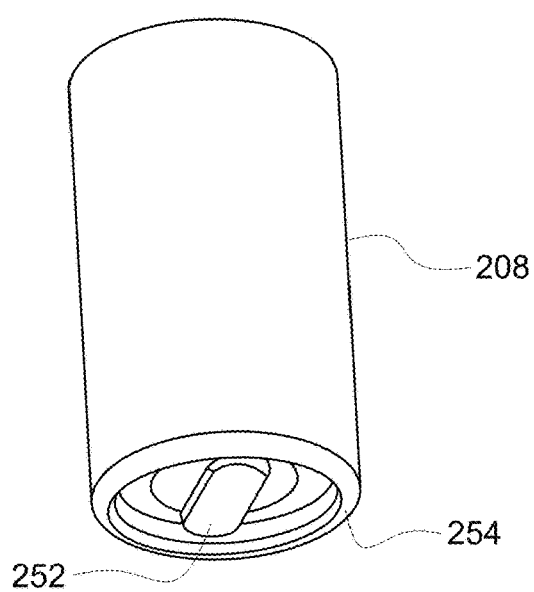
FIG. 38 illustrates a bottom perspective view of the cup of the container system of FIG. 23.

FIG. 38 illustrates the cup 208 having a cup foot 254 formed on the base thereof. The cup foot 254 can include the crossbar 252 and a base 254, such as a rubber, silicone, or the like type of base. The base can help prevent excess sounds from the cup 208 when placed on a surface and can also help prevent inadvertent sliding of the cup 208 on a surface.

Figure 39:
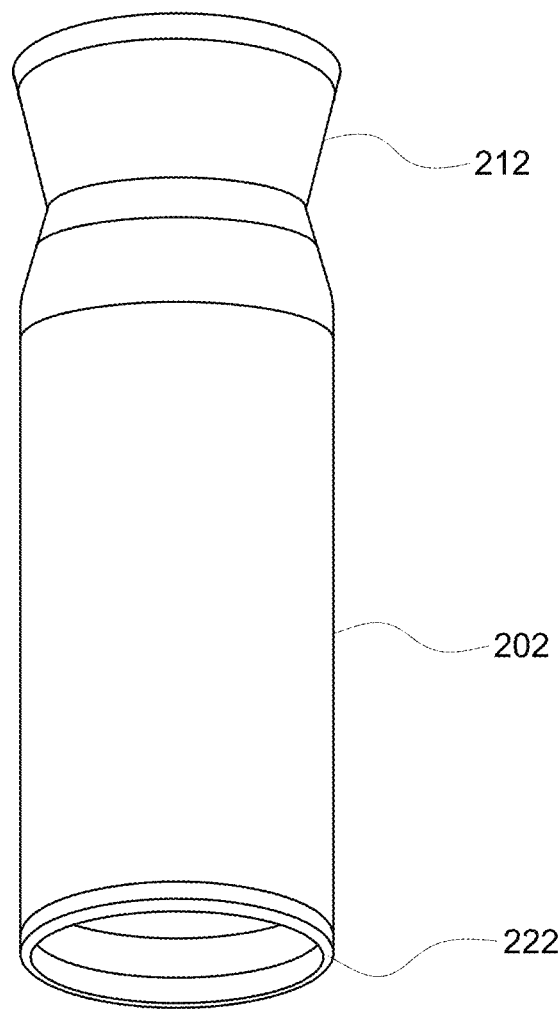
FIG. 39 illustrates a bottom perspective view of the shell of the container system of FIG. 23.

FIG. 39 illustrates a base 222 of the shell 202 that can, like the base 254, be formed from rubber, silicone, or the like, to help prevent excess sounds during placement of the shell/vessel onto a surface and to prevent inadvertent sliding thereof.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

Claim elements and steps herein may have been numbered and/or lettered solely as an aid in readability and understanding. Any such numbering and lettering in itself is not intended to and should not be taken to indicate the ordering of elements and/or steps in the claims.

Many alterations and modifications may be made by those having ordinary skill in the art without departing from the spirit and scope of the invention. Therefore, it must be understood that the illustrated embodiments have been set forth only for the purposes of examples and that they should not be taken as limiting the invention as defined by the following claims. For example, notwithstanding the fact that the elements of a claim are set forth below in a certain combination, it must be expressly understood that the invention includes other combinations of fewer, more or different ones of the disclosed elements.

The words used in this specification to describe the invention and its various embodiments are to be understood not only in the sense of their commonly defined meanings, but to include by special definition in this specification the generic structure, material or acts of which they represent a single species.

The definitions of the words or elements of the following claims are, therefore, defined in this specification to not only include the combination of elements which are literally set forth. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptually equivalent, what can be obviously substituted and also what incorporates the essential idea of the invention.

What is claimed is:

1. A container system comprising:
a vessel configured to contain a first fluid therein;
a shell attached about an exterior of the vessel;
a vessel lid removably attached to an open end of the vessel, the open end extending outside of the shell;
a cup movable between a nested position and a removed position, the cup being at least partially nested with a lower portion of the vessel, removably attached to the vessel, and within the shell when in the nested position;
a cup lid fixed to the container system in the nested, stowed configuration and removable from the container system to cover the cup when the cup is un-nested from the vessel; and
threads at the open end of the vessel, the threads engaging with corresponding threads on the vessel lid to removably engage the vessel lid to the open end of the vessel.

2. The container system of claim 1, further comprising a wrap fitting about the lower portion of the vessel, between the vessel and the cup when the cup is in the nested position.

3. The container system of claim 1, wherein the vessel includes male threads about an external surface thereof, the male threads mating with female threads of the cup when the cup is in the nested configuration.

4. The container system of claim 1, further comprising male threads about a portion of the external periphery of the cup lid, the male threads engaging with female threads of the cup to removably engage the cup lid on the cup.

5. The container system of claim 1, further comprising a crossbar extending from an underside of the cup lid, the crossbar engaging a cross cutout formed in the vessel lid to removably engage the cup lid to the vessel lid.

6. The container system of claim 1, further comprising a crossbar extending from a base of the cup, the crossbar engaging a cross cutout formed in the vessel lid to removably engage the cup to the vessel lid.

7. The container system of claim 1, further comprising a resiliently depressible ball on an inside surface of the shell, the ball engaging with a depression in the vessel.

8. The container system of claim 7, wherein the depression communicates with a slot in the vessel, the ball aligning with the slot to engage the depression with the vessel is moved inside the shell.

9. The container system of claim 1, further comprising a plug fitting on either the vessel lid or on an open bottom of the shell.

10. The container system of claim 1, further comprising a base member on the cup, the base member providing an interface between the bottom of the cup and a surface onto which the cup is placed.

11. The container system of claim 1, further comprising a straw storable on the plug and removable to provide a straw fitting in an opening in the cup lid.

12. A container system comprising:
a vessel configured to contain a first fluid therein;
a shell attached about an exterior of the vessel;
a vessel lid removably attached to an open end of the vessel, the open end extending outside of the shell;
a cup movable between a nested position and a removed position, the cup being at least partially nested with a lower portion of the vessel, removably attached to the vessel, and within the shell when in the nested position;
a cup lid removably fitting on an open end of the cup;
cup engaging male threads about an external surface of the vessel, the cup engaging male threads mating with female threads of the cup when the cup is in the nested configuration;
vessel end male threads at the open end of the vessel, the vessel end male threads mating with female threads on the vessel lid to removably engage the vessel lid to the open end of the vessel; and
cup lid male threads about a portion of the external periphery of the cup lid, the cup lid male threads engaging with the female threads of the cup to removably engage the cup lid on the cup, the cup lid male threads having the same size and pitch as the cup engaging male threads.

13. The container system of claim 12, further comprising a crossbar extending from an underside of the cup lid, the crossbar engaging a cross cutout formed in the vessel lid to removably engage the cup lid to the vessel lid.

14. The container system of claim 12, further comprising a crossbar extending from a base of the cup, the crossbar engaging a cross cutout formed in the vessel lid to removably engage the cup to the vessel lid.

15. The container system of claim 12, further comprising a resiliently depressible ball on an inside surface of the shell, the ball engaging with a depression in the vessel.

16. The container system of claim 15, wherein the depression communicates with a slot in the vessel, the ball aligning with the slot to engage the depression with the vessel is moved inside the shell.

17. A container system comprising:
a vessel configured to contain a first fluid therein;
a shell attached about an exterior of the vessel;
a vessel lid removably attached to an open end of the vessel, the open end extending outside of the shell;
a cup movable between a nested position and a removed position, the cup being at least partially nested with a lower portion of the vessel, removably attached to the vessel, and within the shell when in the nested position;
a cup lid removably fitting on an open end of the cup, the cup lid removably engaged with the vessel lid when the cup is in the nested position;
cup engaging male threads about an external surface of the vessel, the cup engaging male threads mating with female threads of the cup when the cup is in the nested configuration;
vessel end male threads at the open end of the vessel, the vessel end male threads mating with female threads on the vessel lid to removably engage the vessel lid to the open end of the vessel;
cup lid male threads about a portion of the external periphery of the cup lid, the cup lid male threads engaging with the female threads of the cup to removably engage the cup lid on the cup, the cup lid male threads having the same size and pitch as the cup engaging male threads;
a cup lid crossbar extending from an underside of the cup lid, the cup lid crossbar engaging a cross cutout formed in the vessel lid to removably engage the cup lid to the vessel lid;
a cup base crossbar extending from a base of the cup, the cup base crossbar engaging the cross cutout formed in the vessel lid to removably engage the cup to the vessel lid; and
a resiliently depressible ball on an inside surface of the shell, the ball engaging with a depression in the vessel, wherein the depression communicates with a slot in the vessel, the ball aligning with the slot to engage the depression with the vessel is moved inside the shell.

18. The container system of claim 17, further comprising a wrap fitting about the lower portion of the vessel, between the vessel and the cup when the cup is in the nested position.

19. The container system of claim 1, further comprising a foot on a base of the shell, the foot providing an interface between the bottom of the shell and a surface onto which the shell is placed.

20. The container system of claim 1, wherein a bottom portion of the cup is removably attachable to the vessel lid to removably engage the cup to the vessel lid.

21. The container system of claim 1, wherein the cup lid is removably attachable to the vessel lid to removably engage the cup lid to the vessel lid.

* * * * *